US010346947B2

(12) United States Patent
Thakkar et al.

(10) Patent No.: US 10,346,947 B2
(45) Date of Patent: *Jul. 9, 2019

(54) METHOD AND SYSTEM FOR STORING AND RETRIEVING WIDE-AREA MOTION IMAGERY FRAMES AS OBJECTS ON AN OBJECT STORAGE DEVICE

(71) Applicant: PIXIA CORP., Reston, VA (US)

(72) Inventors: Rahul C. Thakkar, Leesburg, VA (US); Rudolf O. Ernst, Leesburg, VA (US); Nabil Al Ramli, Herndon, VA (US)

(73) Assignee: PIXIA CORP., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,265

(22) Filed: Jun. 20, 2016

(65) Prior Publication Data

US 2016/0292817 A1  Oct. 6, 2016

Related U.S. Application Data

(63) Continuation of application No. 13/774,290, filed on Feb. 22, 2013, now Pat. No. 9,396,514.

(60) Provisional application No. 61/692,498, filed on Aug. 23, 2012.

(51) Int. Cl.
G09G 5/393 (2006.01)
G06T 1/60 (2006.01)
G06F 16/51 (2019.01)

(52) U.S. Cl.
CPC ............... *G06T 1/60* (2013.01); *G06F 16/51* (2019.01)

(58) Field of Classification Search
CPC ........................................................ G09G 5/393
USPC ............................................................. 345/565
See application file for complete search history.

(56) References Cited

U.S. PATENT DOCUMENTS

| 2001/0033390 | A1 | 10/2001 | Tonegawa |
| 2003/0032033 | A1 | 2/2003 | Anglin et al. |
| 2003/0113027 | A1 | 6/2003 | Chan et al. |
| 2004/0039741 | A1 | 2/2004 | Benson et al. |
| 2004/0044837 | A1 | 3/2004 | Hasbun |
| 2007/0019810 | A1* | 1/2007 | Suzue .................. G06F 21/606 380/203 |

(Continued)

OTHER PUBLICATIONS

International Search Report for PCT/US2013/056474.

(Continued)

*Primary Examiner* — Yi Yang
(74) *Attorney, Agent, or Firm* — Pillsbury Winthrop Shaw Pittman LLP

(57) ABSTRACT

A method, implemented by a computer system, and a system of organizing data of a wide area motion imagery frame and a method and a system of retrieving objects that match a user defined AOI from an image in a WAMI frame in a WAMI collection are described. The method of organizing includes dividing, by the computer system, an image of a WAMI frame into a plurality of tiles, each tile in the plurality of tiles comprising a plurality of pixels and having a pixel width and a pixel height; storing, by the computer system, the plurality of tiles as objects in an OSD, each object having an object identifier (OID); collecting, by the computer system, object identifiers (OIDs) of the objects; and storing, by the computer system, the OIDs in the OSD.

23 Claims, 28 Drawing Sheets

(56) References Cited

U.S. PATENT DOCUMENTS

| | | | |
|---|---|---|---|
| 2007/0201752 A1* | 8/2007 | Gormish | G06K 9/00442 |
| | | | 382/232 |
| 2009/0089078 A1* | 4/2009 | Bursey | G06Q 10/101 |
| | | | 705/300 |
| 2011/0286530 A1* | 11/2011 | Tian | H04N 21/2365 |
| | | | 375/240.25 |
| 2012/0120312 A1 | 5/2012 | Yamasaki et al. | |
| 2012/0249808 A1* | 10/2012 | Hirota | H04N 1/00241 |
| | | | 348/207.1 |

OTHER PUBLICATIONS

Anonymous: Oracle Spatial GeoRaster Developer's Guide 11g release (11.1) B228398-03, Aug. 1, 2008, Retrieved from the Internet URL:http://www.oracle.com/p1s/db111/to_pdf?pathname=appdev.111/b28398.pdf.

McCormack, et al., "PII: Virtual-Memory tiling for Spatial Data Handling in GIS", Jan. 20, 1997, pp. 659-669, Retrieved from the Internet URL:http//www.sciencedirect.com/science/article/pii/S0098300497000332/pdf?md5=4a6bd79a963d4dd12503001636badd83&pid=1-s20-S0098300497000332-main.pdf.

Porter et al., "Wide Area Motion Imagery", IEEE Signal Processing Magazine, IEEE Service Center, Piscataway, NJ, US, vol. 38, No. 5, Sep. 1, 2010, pp. 56-65.

Written Opinion of International Preliminary Examining Authority dated Sep. 16, 2014 for PCT/US2013/056474.

International Preliminary Report on Patentability dated Dec. 15, 2014 for PCT/US2013/056474.

\* cited by examiner

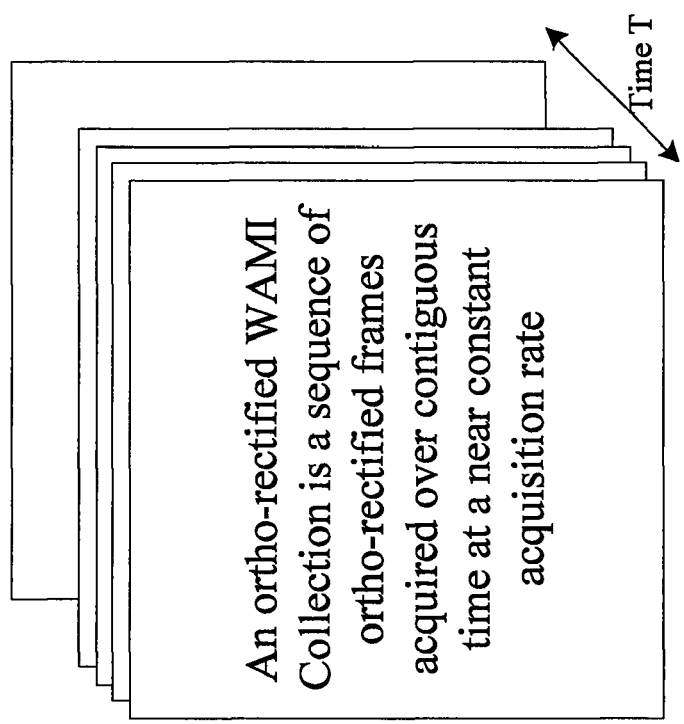
FIG. 1
(CONVENTIONAL)

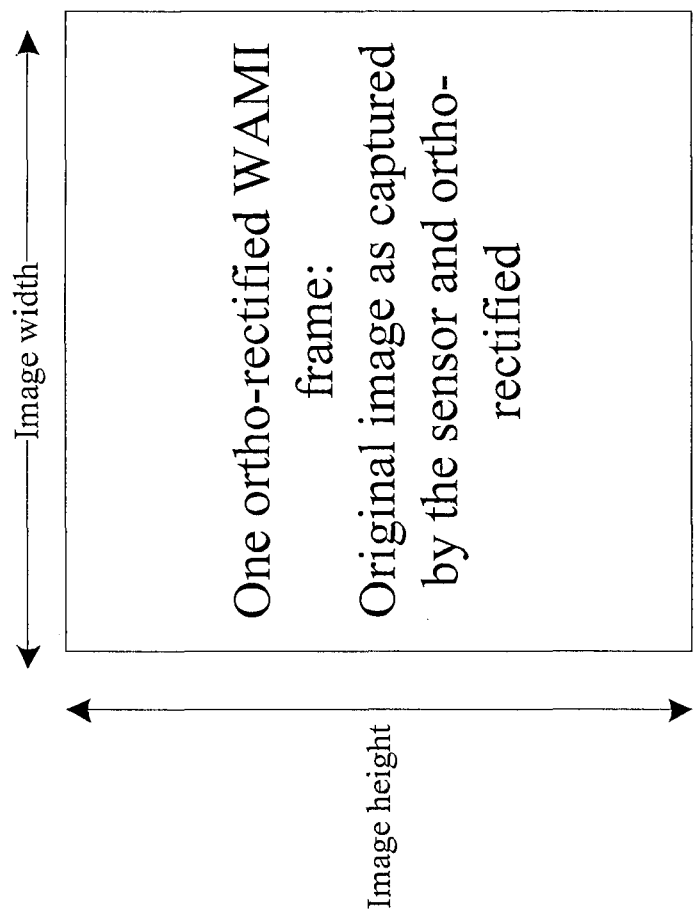
FIG. 2
(CONVENTIONAL)

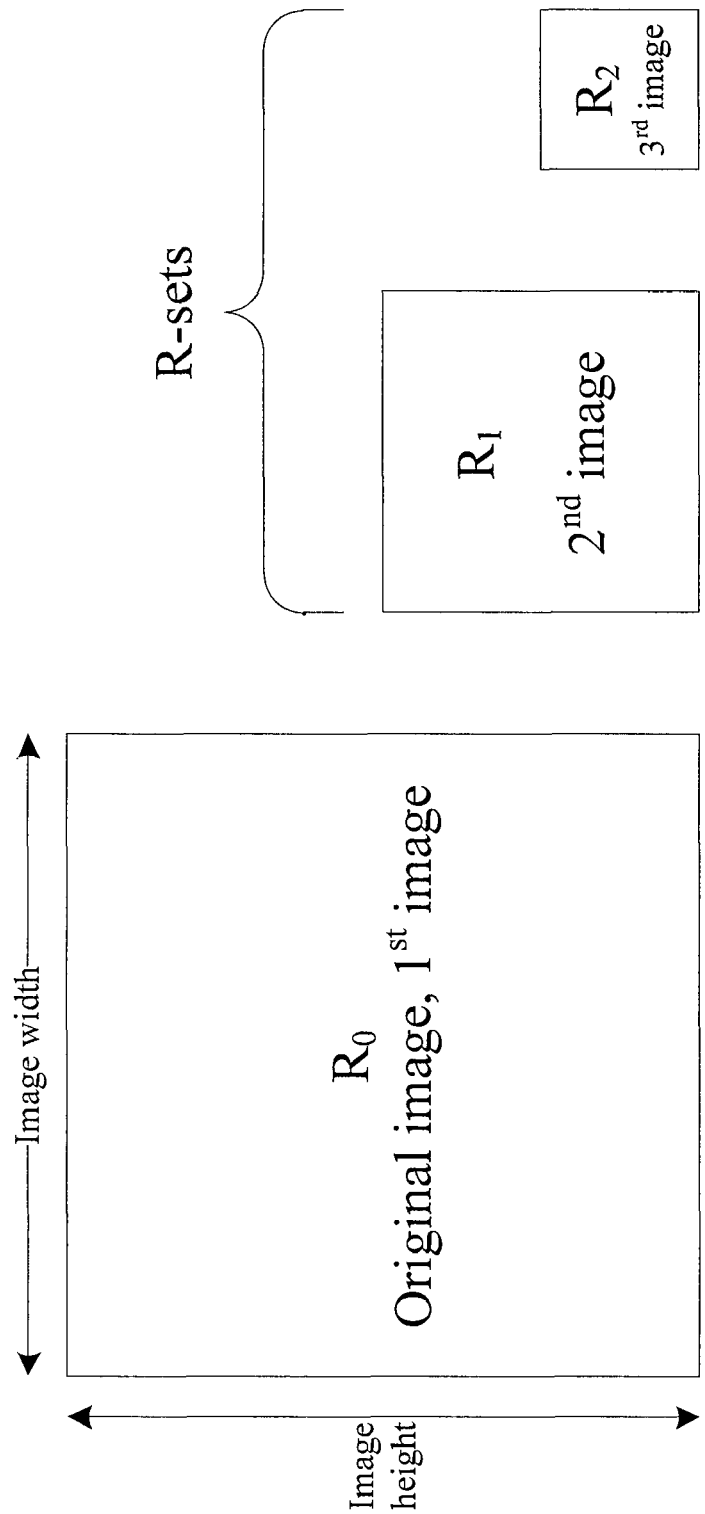
FIG. 3
(CONVENTIONAL)

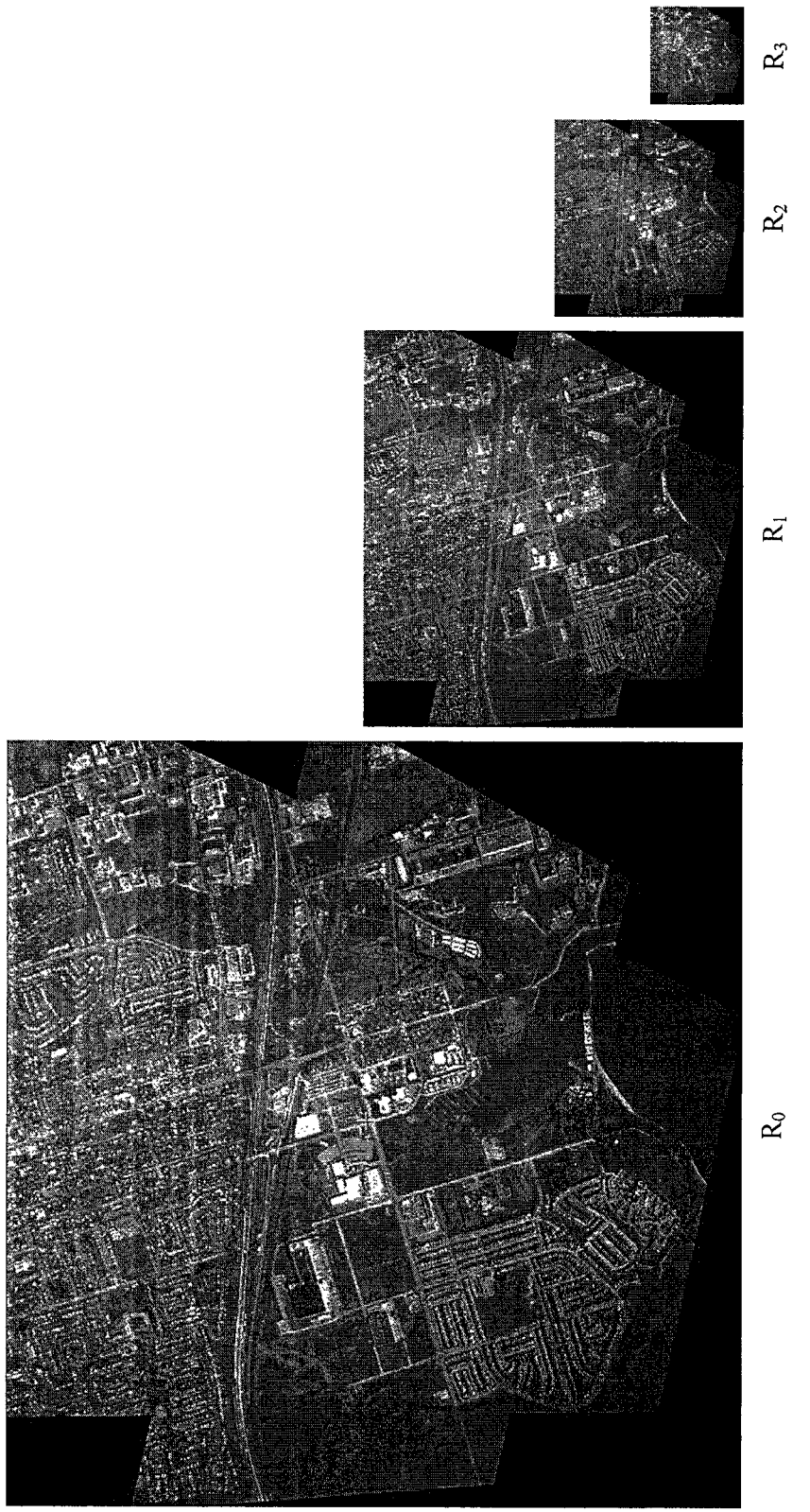
FIG. 4
(CONVENTIONAL)

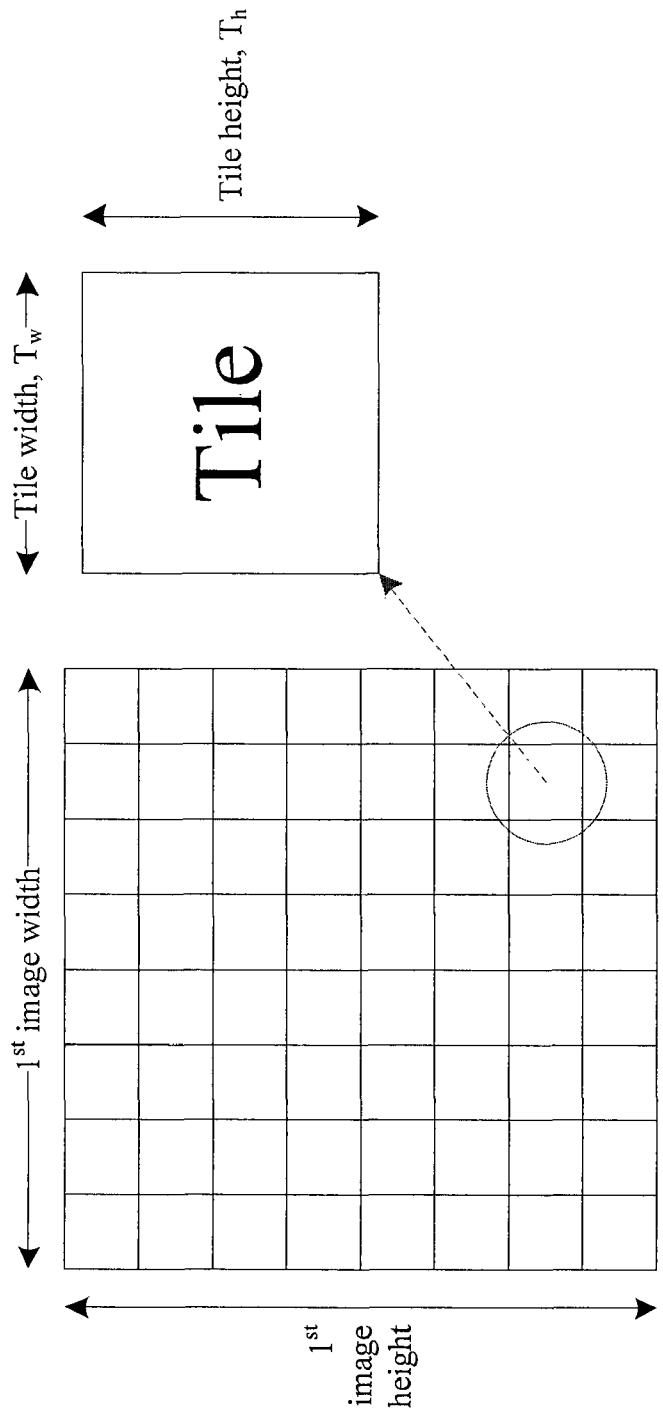
FIG. 5
(CONVENTIONAL)

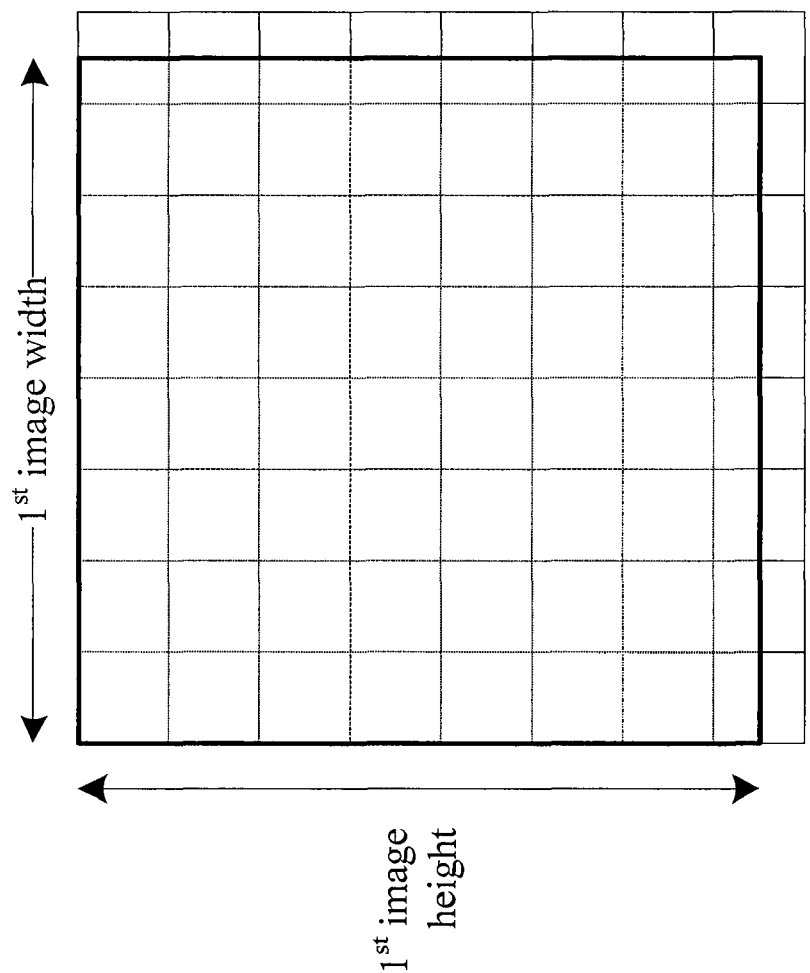
FIG. 6
(CONVENTIONAL)

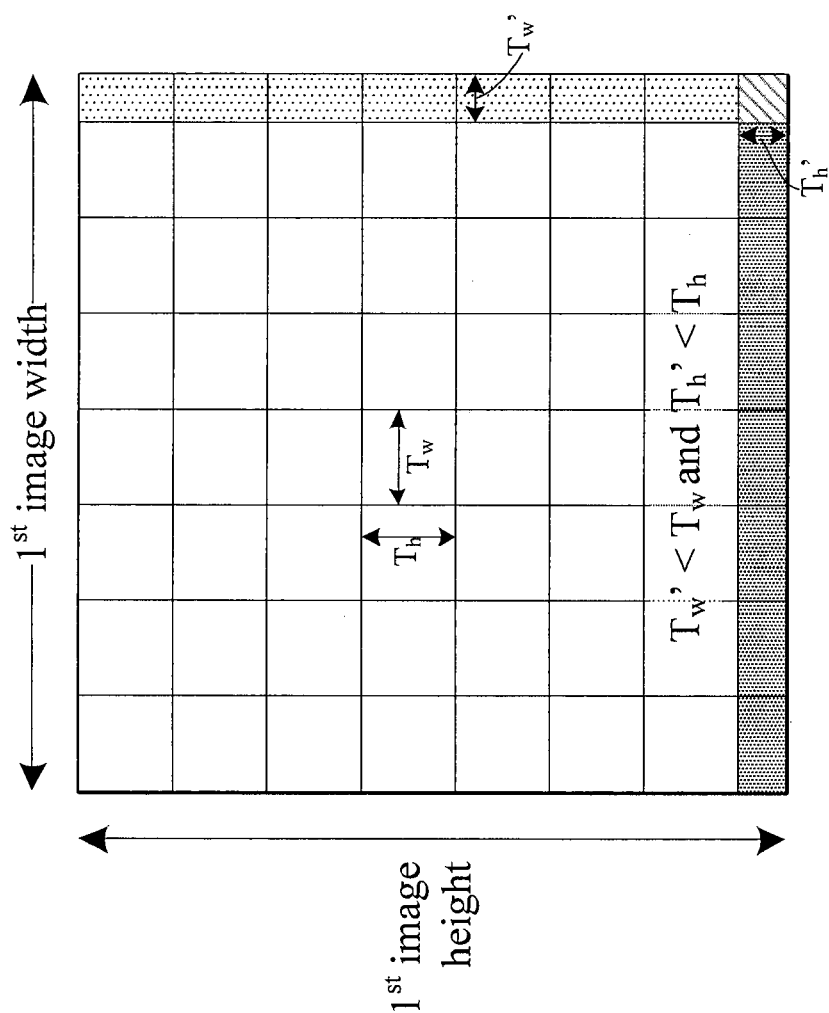
FIG. 7
(CONVENTIONAL)

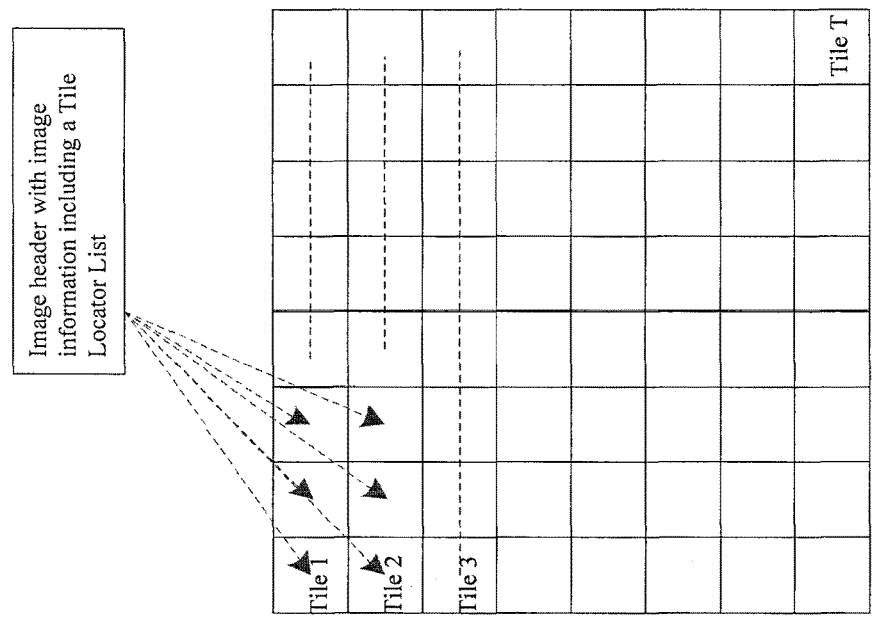
FIG. 8
(CONVENTIONAL)

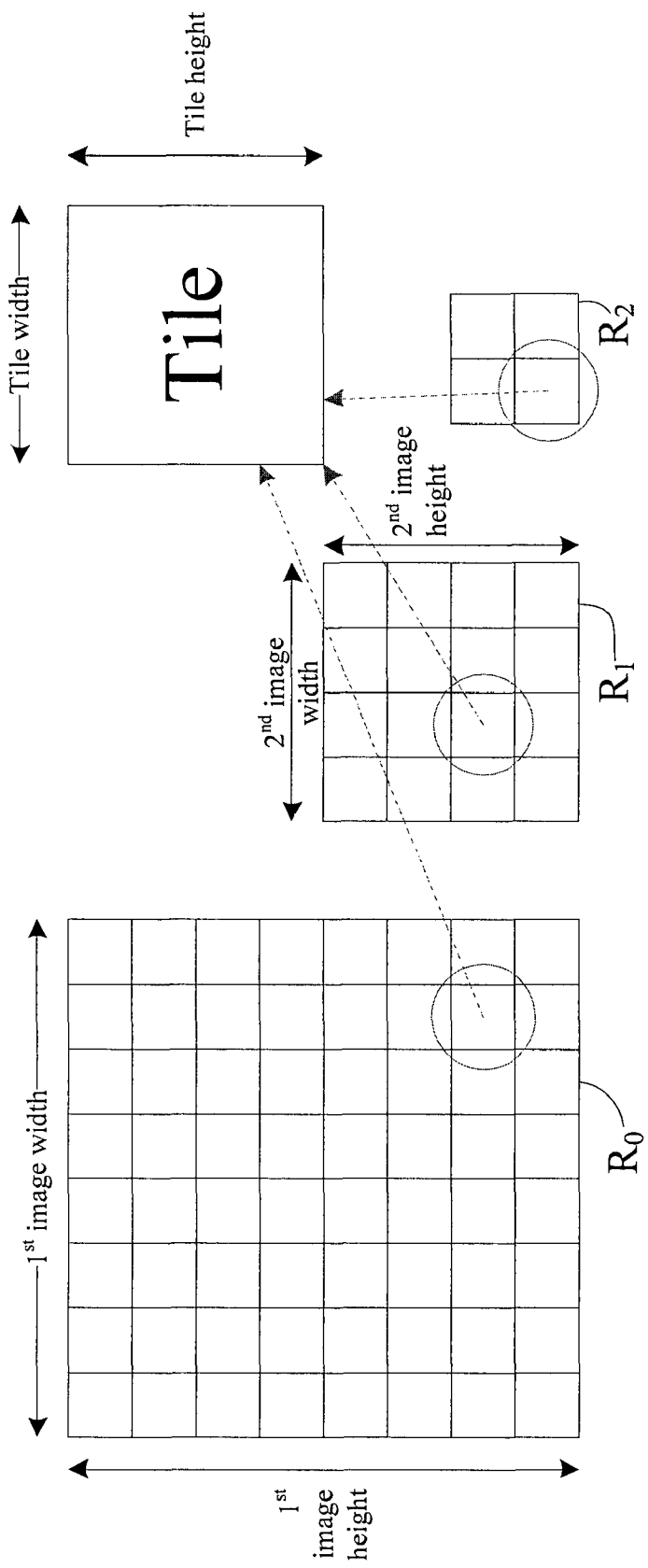
FIG. 9
(CONVENTIONAL)

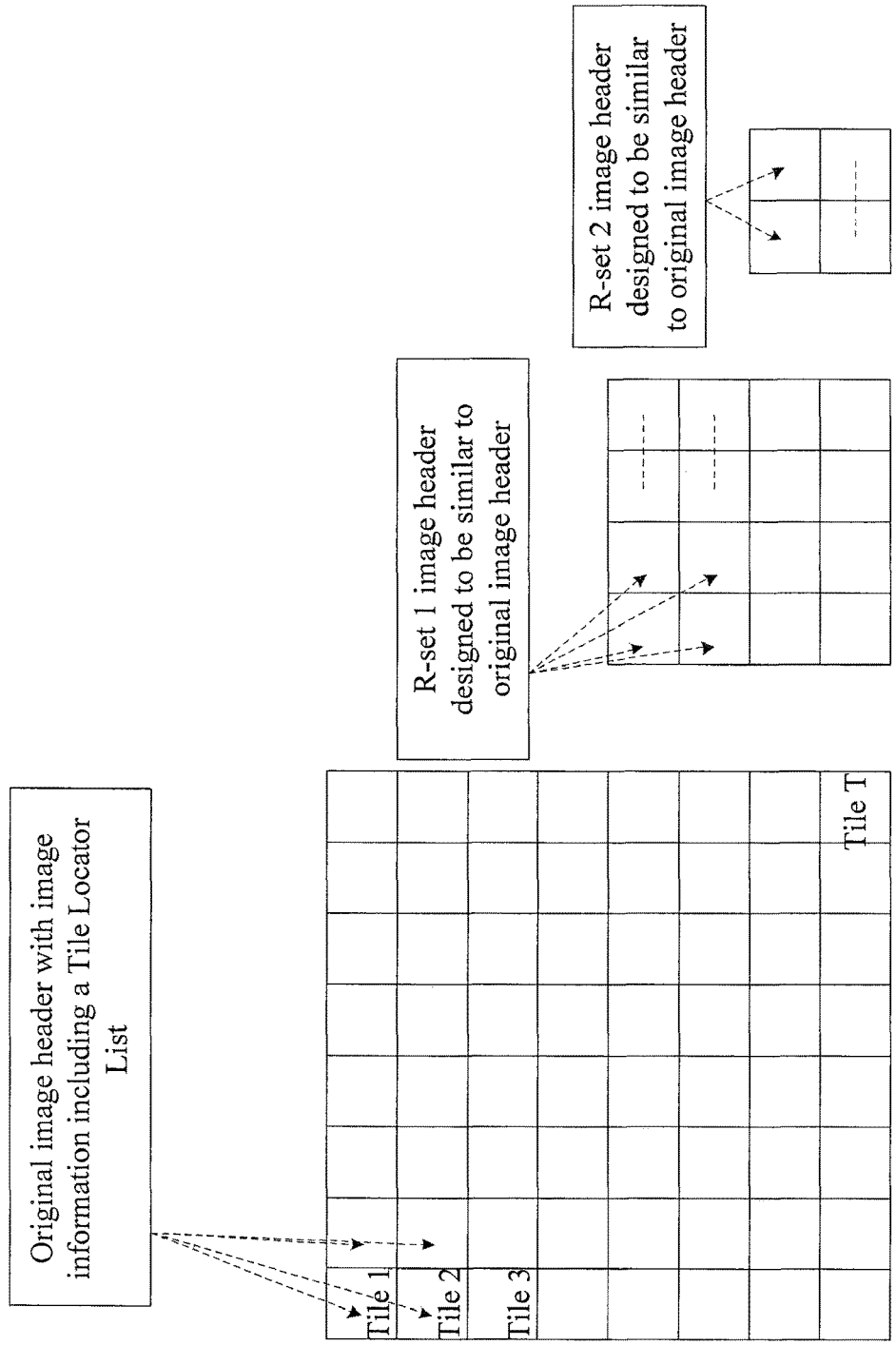
FIG. 10
(CONVENTIONAL)

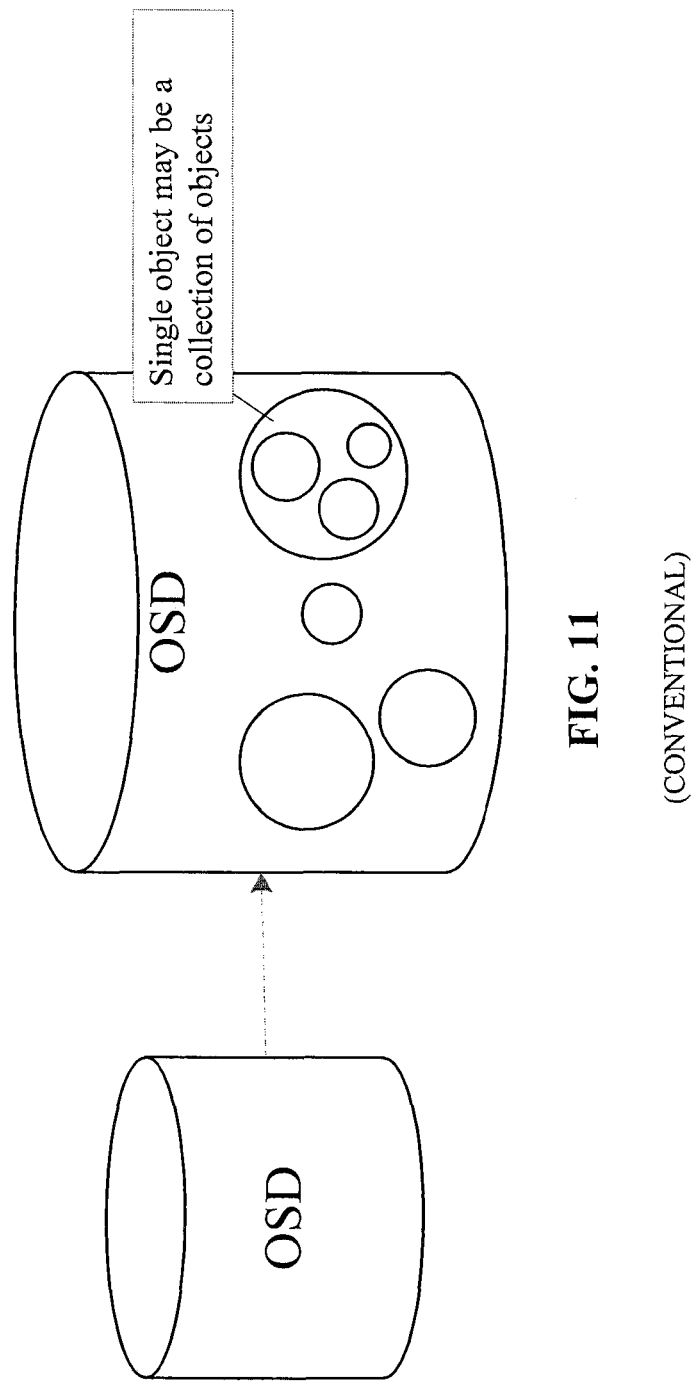
FIG. 11
(CONVENTIONAL)

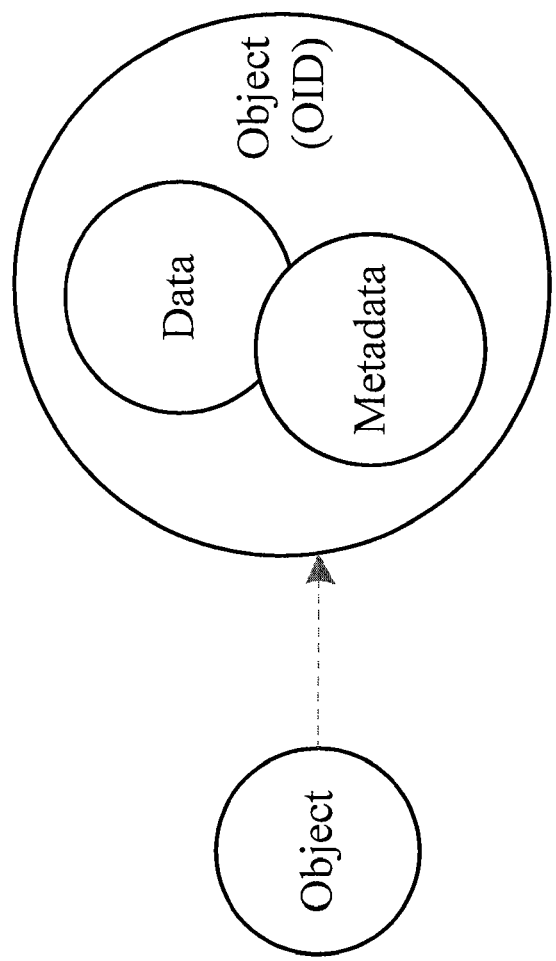
FIG. 12
(CONVENTIONAL)

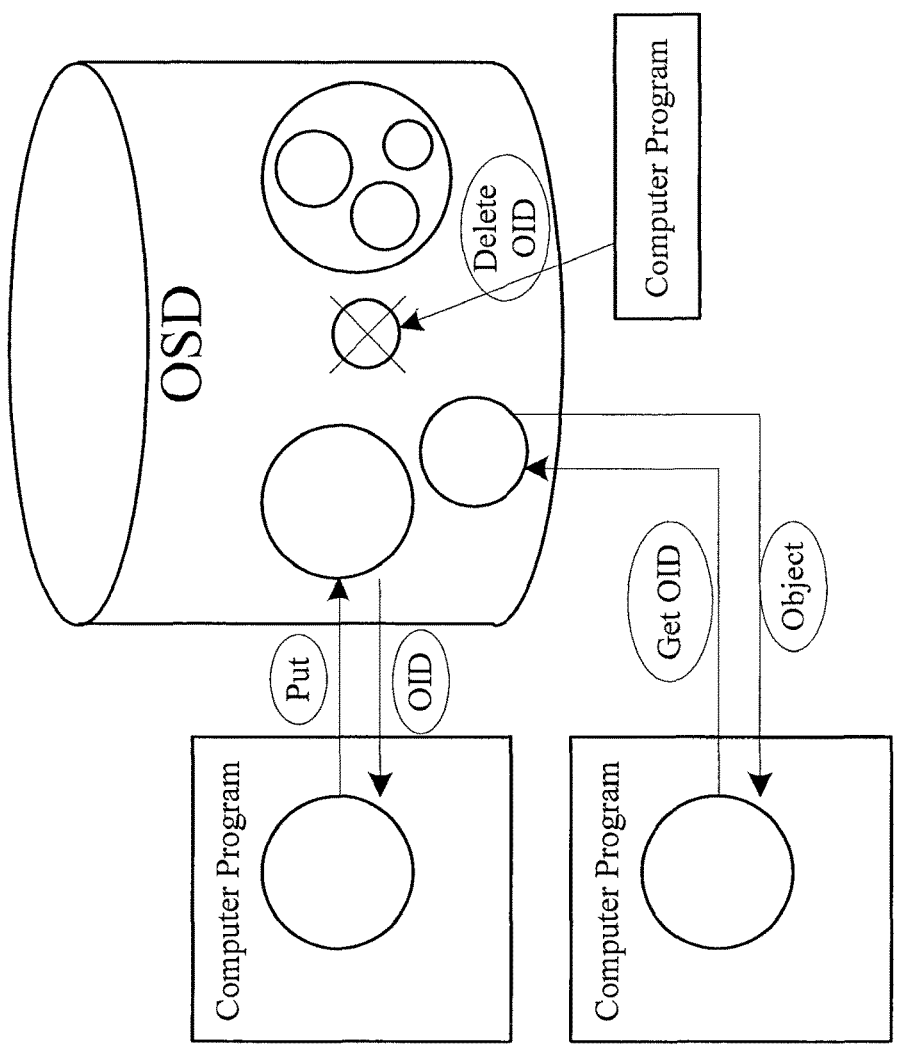
FIG. 13
(CONVENTIONAL)

METHOD AND SYSTEM FOR STORING AND RETRIEVING WIDE-AREA MOTION IMAGERY FRAMES AS OBJECTS ON AN OBJECT STORAGE DEVICE

CROSS-REFERENCE TO RELATED APPLICATIONS

This application is a continuation of U.S. application Ser. No. 13/774,290, filed Feb. 22, 2013, which claims the benefit of U.S. Provisional Application No. 61/692,498 filed on Aug. 23, 2012, the entire content of both applications are incorporated herein by reference in their entirety.

BACKGROUND OF THE INVENTION

1. Field of the Invention

The present invention pertains to image data management and in particular to a method of organizing and storing imagery and metadata from a collection of Wide Area Motion Imagery (WAMI) frames into an Object Storage Device (OSD) and a method of retrieving tile objects that intersect with an Area of Interest (AOI) from a WAMI frame within a collection of WAMI frames that are stored on an OSD.

2. Discussion of Related Art

An image generally contains a plurality of pixels (e.g., several hundred megapixels) and each pixel has one, two or more bands. Each band has a certain color depth or bit depth. For example, an RGB color-based image has 3 bands, the red band (R), the green band (G) and the blue band (B). Each of the R, G and B bands can have a depth of 8 bits or more.

An image sensor can be used to capture a series of images, each image having several hundred megapixels. The images may be captured in sequence, for example at a reasonably constant frequency or rate. Each image (i.e., each still image) in the sequence or series of images may have one or more distinct bands and may cover any part of the electromagnetic spectrum that can be captured by the image sensor. The image sensor may be a single sensor or a combination of a matrix of multiple sensors arranged to generate a single image. Therefore, the series of relatively large images captured by an image sensor over a certain period of time at a near constant capture rate are considered to be large format motion imagery or WAMI.

An image detector may be comprised of multiple image sensors arranged in some configuration, such as, for example, a matrix. Each image sensor in the multiple image sensors can produce a separate image at a substantially same instant in time. Thus, for an instant in time, a notionally single region captured by such a sensor can include several images captured by the multiple sensors. These several images can be combined to generate a single large mosaic image of the area covered by all the sensors for that instant in time. These several images can also be considered to be a large format motion imagery frame or a WAMI frame.

The image output by the image sensor or detector may be ortho-rectified or ground corrected to generate a map, which is also an image. The original or first image (i.e., WAMI frame) captured and output by the image sensor may be optionally converted into a sequence of progressively smaller images. Each subsequent image in the sequence is smaller than the previous image in the sequence. The progressively smaller images are referred to as R-sets, reduced resolution datasets (RRDs). An ortho-rectified WAMI frame comprises the original or first image (WAMI frame) and a sequence of zero or more R-set images.

The term ortho-rectified, in the present context, may be used interchangeably with the terms geo-rectified, planar-rectified and geo-corrected. The term ortho-rectified, in the present context, refers to an image that allows a form of per-pixel spatial reference (e.g., geospatial reference). An ortho-rectified image is an image that is corrected so that the scale in the image is uniform such that distances shown are uniform and can be measured like a map. Orthorectification is the process of removing the effects of image perspective (e.g., tilt) and relief effects for the purpose of creating a planimetrically correct image. The resultant orthorectified image has a constant scale wherein features are represented in their "true" positions.

The ortho-rectified image maybe stored in a known or proprietary file format. The format may contain a header which is a computer data structure that describes various parameters of the image, as well as may hold additional metadata about the image, for example, time of acquisition, information about the capturing device, geographic reference data, access rights, and copyright information, etc.

An object storage device (OSD) is a conventional computer data storage method wherein a collection of bytes, referred to as data, is stored on the OSD as objects. Each object is assigned a globally unique Object Identifier (OID). An OSD is different from a Traditional File System that stores data as files in a hierarchy of folders on a block-based storage device.

BRIEF SUMMARY OF THE INVENTION

An aspect of the present invention is to provide a method, implemented by a computer system, and a system of organizing data of a wide area motion imagery frame. The method includes dividing, by the computer system, an image of a WAMI frame into a plurality of tiles, each tile in the plurality of tiles comprising a plurality of pixels and having a pixel width and a pixel height; storing, by the computer system, the plurality of tiles as objects in an OSD, each object having an object identifier (OID); collecting, by the computer system, object identifiers (OIDs) of the objects; and storing, by the computer system, the OIDs in the OSD.

Another aspect of the present invention is to provide a method, implemented by a computer system, and a system of retrieving objects that match a user defined area of interest (AOI) from an image in a WAMI frame in a WAMI collection, the image having one or more tiles, and the object being stored in a reference file associated with the WAMI collection containing the WAMI frame. The method includes receiving, by the computer system, a request for the AOI, the AOI being wholly located in the image, and the AOI having one or more tiles, the request including an origin and a pixel width and a pixel height of the AOI; computing, by the computer system, a top row and a left column number of a tile that contains a top-left corner of the AOI and a bottom row and a right column number of a tile that contains a bottom-right corner of the AOI; and computing, by the computer system, for each column from the left column to the right column and for each row from the top row to the bottom row, a tile index of each tile in the one or more tiles of the AOI, in a tile locator list to obtain an OID corresponding to each tile. The method further includes sending, by the computer system, a request to an OSD containing a plurality of objects tiles of the WAMI frame to retrieve an object associated with each of the one or more tiles of the AOI.

A further aspect of an embodiment of the present invention is to provide a system of organizing data of a wide area motion imagery frame. The system includes a processor configured to: divide an image of a wide area motion imagery (WAMI) frame into a plurality of tiles, each tile in the plurality of tiles comprising a plurality of pixels and having a pixel width and a pixel height; store the plurality of tiles as objects in an object storage device (OSD), each object having an object identifier (OID); collect object identifiers (OIDs) of the objects; and store the OIDs in the object storage device (OSD).

Another aspect of an embodiment of the present invention is to provide a system of retrieving objects that match a user defined area of interest (AOI) from an image in a WAMI frame in a WAMI collection, the image having one or more tiles, and the object being stored in a reference file associated with the WAMI collection containing the WAMI frame. The system includes a processor configured to: receive a request for the AOI, wherein the AOI is wholly located in either the image, and the AOI having one or more tiles, the request including an origin and a pixel width and a pixel height of the AOI; compute a top row and a left column number of a tile that contains a top-left corner of the AOI and a bottom row and a right column number of a tile that contains a bottom-right corner of the AOI; compute for each column from the left column to the right column and for each row from the top row to the bottom row, a tile index of each tile in the one or more tiles of the AOI, in a tile locator list to obtain an object identifier (OID) corresponding to each tile; send a request to an object storage device (OSD) containing a plurality of objects tiles of the WAMI frame to retrieve an object associated with each of the one or more tiles of the AOI; and output an image header of the image that contains the requested AOI and tiles from the image that contains the requested AOI.

Although the various steps of the method are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

In the accompanying drawings:

FIG. 1 depicts an ortho-rectified WAMI collection as a sequence of ortho-rectified WAMI frames acquired over a contiguous period in time, at a near constant acquisition rate;

FIG. 2 depicts the original ortho-rectified WAMI image of the WAMI frames;

FIG. 3 illustrates the first image or the original ortho-rectified WAMI image and progressively smaller optional user-defined R-set images;

FIG. 4 depicts an example of an ortho-rectified WAMI frame including the ortho-rectified original image also referred to as the first image and a sequence of three additional R-sets;

FIG. 5 shows a single first image is divided into a set of tiles of a known tile pixel width $T_w$ and tile pixel height $T_h$;

FIG. 6 shows an example first image where the first image pixel width and the first image pixel height are not an integer multiple of $T_w$ and $T_h$;

FIG. 7 shows an example of a first image where the first image pixel width and pixel height are not an integer multiple of $T_w$ and $T_h$ and where the first image is not padded to align its pixel width and pixel height to that of a tile;

FIG. 8 shows an example of a first image having a series of tiles and an image header, the Native Image Header that is part of the data file format of the first image, and optionally a Custom Image Header not included in the Native Image Header;

FIG. 9 depicts the first image and its associated R-sets, each R-set image having tiles that are of the same tile pixel width and pixel height as the first image;

FIG. 10 depicts the first image and its associated R-sets, each R-set image also has a Hybrid Image Header that is similar to the Hybrid Image Header of the first image;

FIG. 11 depicts an OSD including one or more objects;

FIG. 12 depicts an object on an OSD including an OID, data that is stored in the object, and optional metadata that provides complimentary information regarding the data;

FIG. 13 shows basic operations that can be performed on an object within an OSD using the HTTP protocol or an application program interface (API) including the operation "delete", "put", "get";

DETAILED DESCRIPTION OF EMBODIMENTS OF THE INVENTION

Figure 14:
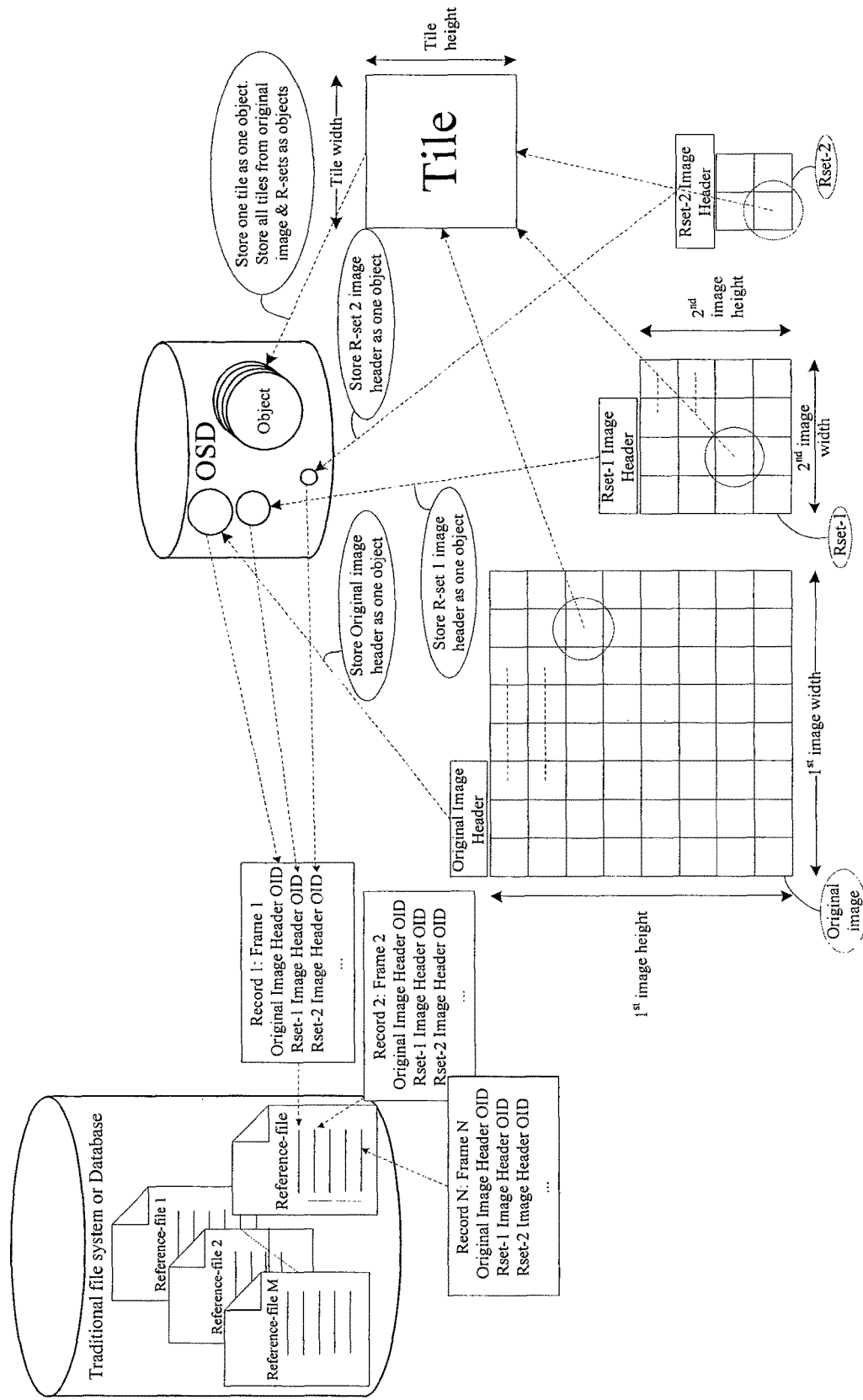
FIG. 14 is a diagram illustrating the method to store a single WAMI frame including the first image and associated R-sets on an OSD, according to an embodiment of the present invention.

FIG. 1 depicts an ortho-rectified WAMI collection as a sequence of ortho-rectified WAMI frames acquired over a contiguous period in time, at a near constant acquisition rate. Ortho-rectified WAMI includes a sequence of WAMI frames captured over time. A Collection of Ortho-rectified WAMI frames (WAMI collection) is defined as a set of one or more frames that are temporally sequential and have been ortho-rectified after being captured. Each ortho-rectified WAMI frame is represented digitally by one or more ortho-rectified images.

The first image is the original image as captured by the WAMI sensor and ortho-rectified. FIG. 2 depicts the original ortho-rectified WAMI image of the WAMI frames or the first image. To each first image can be associated zero, one, two or more images of progressively smaller dimensions than the first image that are referred to herein as reduced resolution datasets or R-sets. An R-set has a smaller pixel width and pixel height than the first image but contains the full extent of the contents of the first image. An R-set is effectively a zoomed-out version of the first image. Creation of R-sets is optional. However, the R-sets may be recommended for optimal run-time performance, for example, when zooming in or out for image visualization. In the following paragraphs, as a notation, $R_0$ refers to the first image, $R_1$ refers to the first R-set or the second image, $R_2$ refers to the second R-set or the third image, and so on until the $N^{th}$ R-set $R_n$. $R_1$ is smaller in pixel dimensions than $R_0$, $R_2$ is smaller in pixel dimensions than $R_1$ and $R_N$ is smaller in pixel dimensions than $R_{N-1}$. There are N R-sets and a total of N+1 images representing one frame. An ortho-rectified WAMI frame has one or more images where the first image is the original image and subsequent images are R-sets derived from the first image.

FIG. 3 illustrates the first image or the original ortho-rectified WAMI image and progressively smaller optional user-defined R-set images. In this case, the R-set contains two images $R_1$ and $R_2$, the image $R_0$ corresponding to the first image. However, as stated above, any number R-set images may be used. The R-set images are can be optional in which case the number of R-set images is zero.

FIG. 4 depicts an example of an ortho-rectified WAMI frame including the ortho-rectified original image also referred to as the first image and a sequence of three additional R-sets. This example image is provided by PV Labs, Inc. There are a total of four images. The original first image $R_0$, and the R-set images including $R_1$, $R_2$ and $R_3$. $R_1$ is substantially dimensionally smaller than the first image, $R_2$ is substantially dimensionally smaller than $R_1$, and $R_3$ is substantially dimensionally smaller than $R_2$.

The first image $R_0$ has a known pixel width and height. Each pixel in the first image has a fixed number of bands, and bit depth per band. Each pixel band has a data type, for example, unsigned 8-bit, signed, unsigned, or floating point 16-bit, 32-bit or 64-bit. The first image may have additional metadata such as, for example, date and time of acquisition, geospatial reference, security, platform and sensor data, etc.

The first image is sub-divided into a set of tiles. FIG. 5 shows a single first image is divided into a set or a matrix of tiles of a known or fixed tile pixel width $T_w$ and tile pixel height $T_h$. A tile is a rectangular subset of the first image comprising of a plurality of pixels. A tile has a known pixel width and pixel height. For a given image, dimensions of a tile in the image are of a fixed pixel width and height that are less than or equal to the pixel width and pixel height of the first image. Each tile is organized either band-interleaved by pixel (BIP) by storing together bytes for all bands for a given pixel in the plurality of pixels of the tile, or band-sequential (BSQ), by storing all pixels in the tile for a first band together followed by storing all pixels in the tile for a second band together.

A set of equal size tiles wholly contain the first image. If the pixel width and pixel height of a tile are not integer multiples of the pixel width and pixel height of the first image, the first image is padded. FIG. 6 shows an example first image where the first image pixel width and the first image pixel height are not an integer multiple of the pixel width $T_w$ and an integer multiple of the pixel height $T_h$ of a tile. In this case, as shown in FIG. 6, the first image is padded by the data laying outside the boundary (shown in bold) of the first image.

If the first image cannot be padded, the tiles along the right and bottom edge of the image may have a different tile pixel widths and tile pixel heights. FIG. 7 shows an example of the first image where the first image pixel width and pixel height are not an integer multiple of $T_w$ and $T_h$ and where the first image is not padded to align its pixel width and pixel height to that of a tile. In this case, additional metadata may be needed to specify the tile pixel width and tile pixel height of all tiles to the right of the image (the dotted area having a width $T_w'$), as well as the tile pixel width and tile pixel height of all tiles at the bottom of the image (the dotted area having the height $T_h'$). The image shown in FIG. 7 has edge tiles with different pixel dimensions than the rest of the tiles in the image.

The first image may be stored in computer memory or on a storage device as an uncompressed or compressed stream of bytes. A stored image can use a known file format layout, including, but not limited to, GeoTIFF, NITF. A compressed first image can use a known compression method including, but not limited to, JPEG2000, JPEG XR. If the first image is compressed and tiled, each tile is compressed separately and its location in the compressed image byte stream and its size are stored in a list, herein referenced as the Tile Locator List (TLL). For example, in the JPEG2000 specification, in a JP2 file format, a TLL is represented by a Tile Length Marker (TLM) list. There is a direct arithmetic mapping between a tile's column and row number within the image and the corresponding entry in a TLL. FIG. 8 shows an example of a first image having a series of tiles and an image header, the Native Image Header that is part of the data file format of the first image, and optionally a Custom Image Header not included in the Native Image Header. The Native Image Header includes the TTL (e.g., JP2 file format has TM list). The Custom Image Header includes image information, tile information (e.g., TLL) such as tile 1 offset and size, tile 2 offset and size, . . . , tile T offset and size. A Hybrid Image Header can be used if Native Image Header lacks any information from Custom image header. The Custom Image Header can be added to the Native Image Header to define a Hybrid Image Header. Segregating both headers, Native Image Header and Custom Image Header, from each other may permit source image reconstruction.

If the image is uncompressed and tiled, and if tile dimensions are the same, each tile is of a known and fixed size in bytes, and its location in the uncompressed image byte stream can be computed. A TLL in this case is not necessary. If tile dimensions are different, a TLL may be needed.

FIG. 9 depicts the first image and its associated R-sets (e.g., $R_1$, $R_2$), each R-set image having tiles that are of the same tile pixel width and pixel height as the first image $R_0$. The R-sets $R_1$ and $R_2$ are tiled to the same tile width and height as the first image $R_0$. The pixel dimensions of a tile for each R-set image are the same as the first image. There are fewer tiles in each subsequent R-set.

FIG. 10 depicts the first image and associated R-sets. Each R-set image also has a Hybrid Image Header that is similar to the Hybrid Image Header of the first image. The storage layout of each R-set image is the same as the first image. The first image has an image header including a TLL. The image header can be a Native Image Header, a Custom Image Header or a combination of both in a Hybrid Image Header. Similarly, the R-set image $R_1$ and the R-set image $R_2$ can be provided with a similar image header as the image header of the first image. Although, two R-set images are depicted in FIG. 10, any number of R-set images can be used. It is recommended that when an R-set fits within a tile, no further R-sets be generated. However, this is at the discretion of the creator of R-sets.

FIG. 11 is a schematic representation of an OSD. An Object-based Storage Solution or OSD is a device that stores a collection of bytes of digital data as Objects.

FIG. 12 depicts the structure of an object on an OSD. An Object is a collection of bytes of the data to be stored and associated optional metadata. Each object is assigned a unique OID. A single object may be used to hold a collection of multiple objects. Commercial Object-based Storage Solutions (OSDs) at least provide a simple interface to support the ability to put, get, and delete Objects. OSDs may also support additional capability to get, put and edit metadata into an object, read partial objects, or replicate objects. These interfaces are often provided through a published HTTP protocol or a published API.

FIG. 13 shows basic operations that can be performed on an object within an OSD using the HTTP protocol or an application program interface (API) including the operation "delete", "put", "get". An OSD may support the ability to read part of an object. An OSD may support the ability to store many objects into one object providing hierarchical storage capability. The operation "Put" stores user-defined data into an object on an OSD and returns an OID for requesting the same object again. The operation "Get" retrieves object data associated with a supplied OID. The operation "Delete" removes the data associated with a supplied OID from the OSD. Examples of OSDs include Amazon S3, DDN WOS™, and Dell™ DX Object Storage Platforms.

In contrast to an OSD, a Traditional File System (TFS) presents a file and folder based abstraction layer on a block storage device. The interaction with a Traditional File System uses implementations of the POSIX standard or analogous methods. Examples of Traditional File Systems include FAT, EXT2, EXT3, EXT4, XFS, CXFS, StorNext®, WAFL®, OneFS®, Lustre®, Gluster® and NTFS.

In the following paragraphs, a method for storing and retrieving ortho-rectified WAMI frames as Objects on an OSD is described. In one embodiment, the method allows for the efficient storage of an ortho-rectified WAMI frame. In one embodiment, the method optimizes the storage of the ortho-rectified WAMI frame for the retrieval of any viewport or area of interest from any WAMI frame.

FIG. 14 is a diagram illustrating a workflow of the method to store a single WAMI frame including the first image and associated R-sets on an OSD, according to an embodiment of the present invention. FIG. 14 provides the workflow of the method as a sequence of six main steps. In the following description, one or more WAMI Collections are used. Each WAMI Collection includes one or more temporally sequential WAMI frames. Each WAMI frame comprises an ortho-rectified original image or first image and a sequence of optional progressively smaller R-set images.

In one embodiment, each image, be it the first image or any one of the R-set images, is divided into a matrix of one or more tiles. Each tile has a known pixel width and a known pixel height. Each image (the first image or any one of the R-set images) also has an image header. The image header includes the original (native) header that may have been delivered as part of the original image file format and an optional custom header that includes TLL and any additional metadata that needs storing with the WAMI frame. The tile pixel dimensions are part of the image header.

Figure 15:
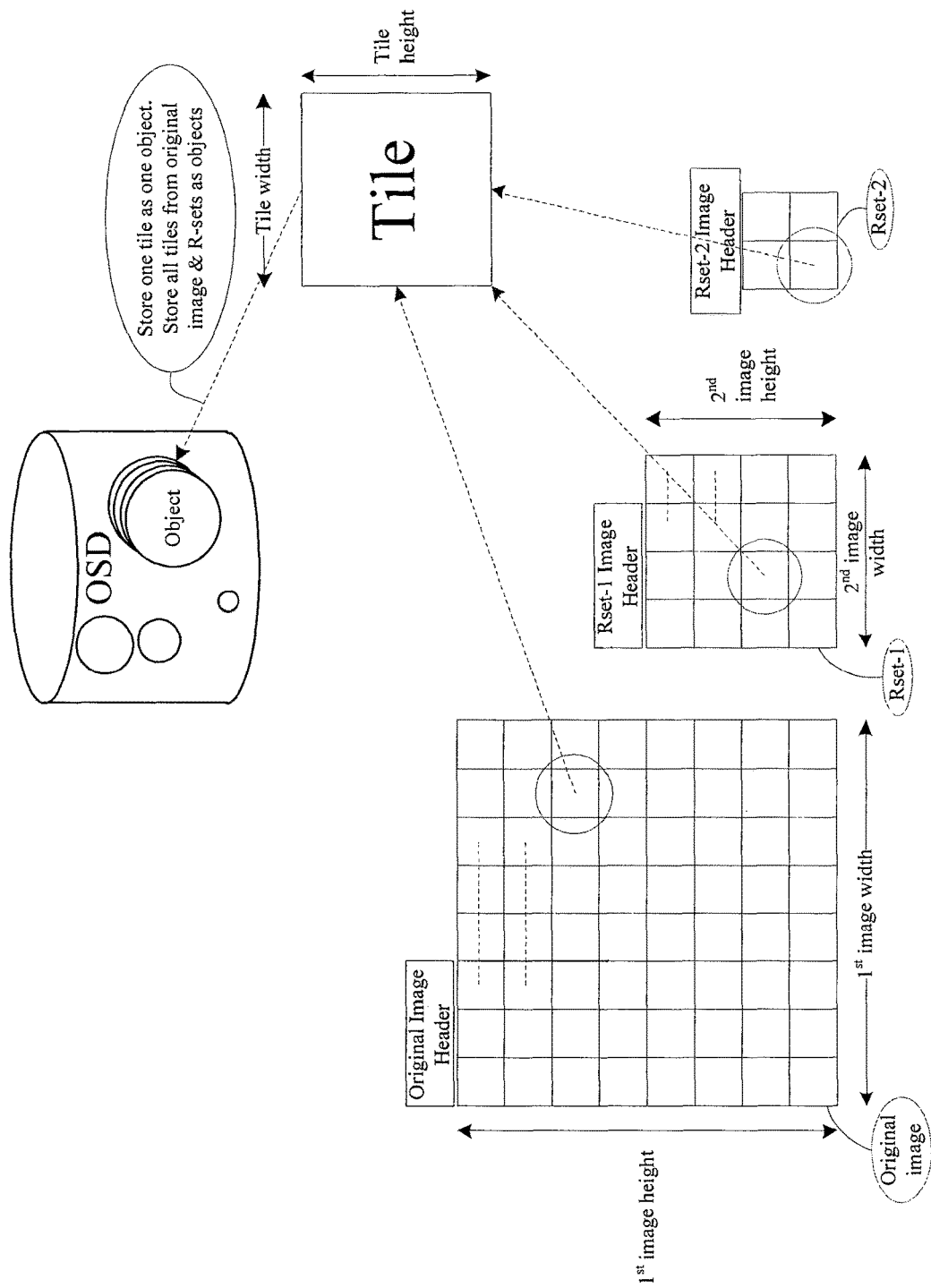
FIG. 15 is a diagram showing a first step in the method of storing a WAMI frame as an object, whereby tiles from the first image and all associated R-sets are stored as objects on the OSD, according to an embodiment of the present invention.

FIG. 15 is a diagram showing a first step in the method of storing a WAMI frame as an object, whereby tiles from the first image and tiles from all associated R-sets are stored as objects on the OSD, according to an embodiment of the present invention. In one embodiment, the first tile of the first image of the first WAMI frame is stored as an Object on an OSD. All tiles of the first image of the first WAMI frame are stored as distinct Objects (first objects) on an OSD. The OIDs of all Objects (first objects) including tiles of the first image are collected and stored in the first image header. In addition, the first tile of the first R-set of the first WAMI frame is stored as an Object on an OSD. All tiles of the first R-set of the first WAMI frame are stored as distinct Objects (second objects) on an OSD. The OIDs of all Objects (second object) including tiles of the first R-set are collected and stored in the first R-set's image header. All tiles of all R-sets of the first WAMI frame are stored as distinct Objects (second objects) on an OSD. The OIDs of all Objects (second objects) including tiles of each R-set are collected and stored in the corresponding R-set's image header.

Figure 16:
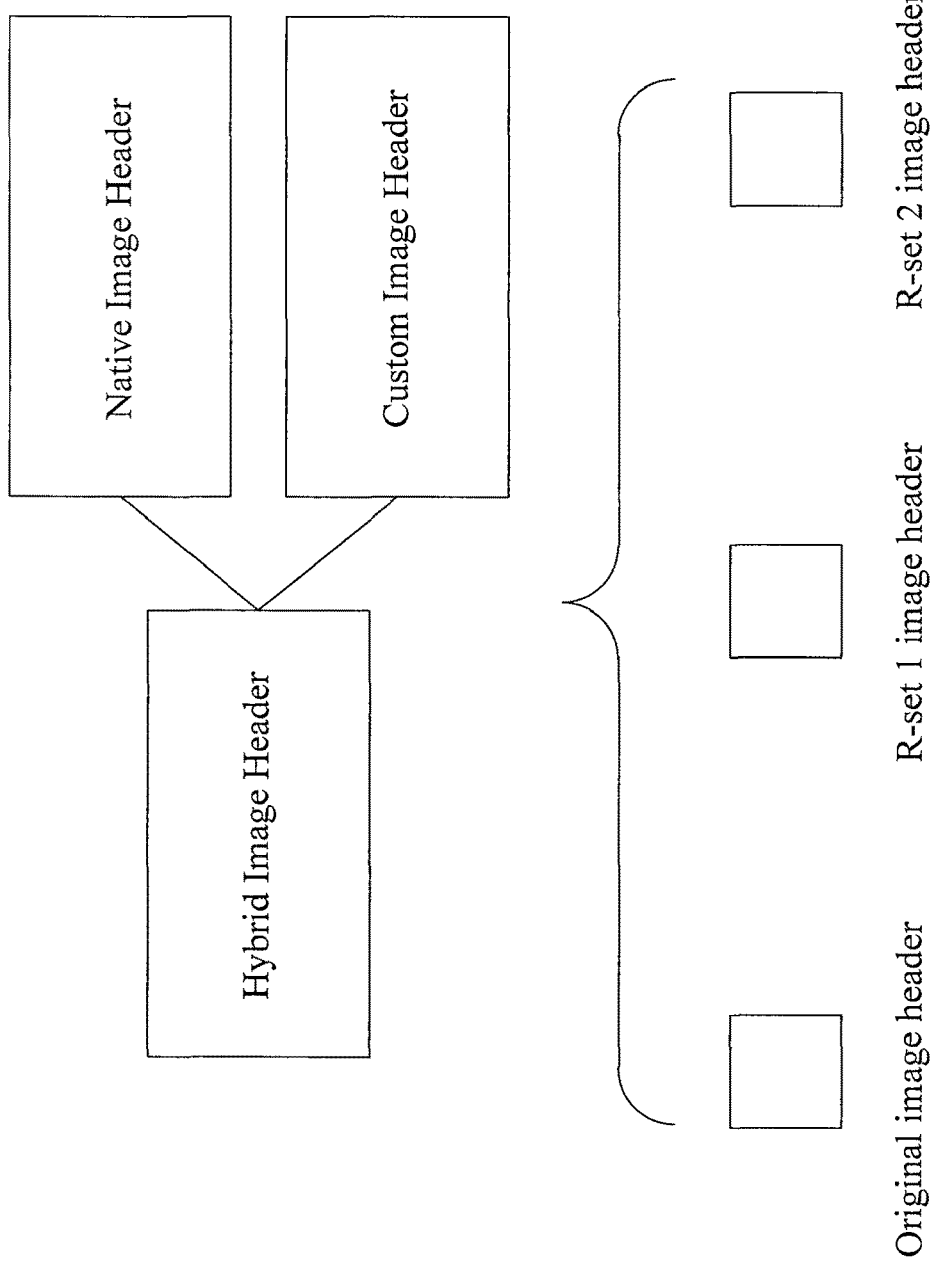
FIG. 16 depicts a hybrid image header of a WAMI frame, according to an embodiment of the present invention.

FIG. 16 depicts a hybrid image header of a WAMI frame, according to an embodiment of the present invention. In one embodiment, the first image header includes the native image header of the original ortho-rectified WAMI image and a custom image header comprising of additional first image metadata, tile dimensions, and a TLL. The TLL comprises of a list of OIDs of all tiles in the first image. Each R-set also includes an image header that is similar to the first image header. The custom image header of each R-set has additional R-set metadata, tile dimensions, and a TLL. The TLL includes a list of OIDs of all tiles in the corresponding R-set.

In one embodiment, the native and custom image headers are segregated. An accurate reassembly of the original first image can be performed by retrieving all objects for the first image, retrieving the native image header and merging the objects and native image header to reconstitute the original image as it was received.

There is a direct mathematical mapping between an entry in the TLL and the row and column number of the tile in the first image. Each tile in either the first image or an R-set has a row number and a column number. For a given first image or R-set, $C_{max}$ is the maximum number of columns and $R_{max}$ is the maximum number of rows of tiles. For any tile $T_{ij}$ at column $C_i$ and row $R_j$, within the given range of tiles, the corresponding entry index in the TLL can be computed. If TLL OIDs for tiles are stored in row major order in a TLL, index I in a TLL for any tile $T_{ij}$ is computed as follows $I=C_i+R_j \times R_{max}$. If TLL OIDs for tiles are stored in column major order in a TLL, the index I in a TLL for any tile $T_{ij}$ is computed as follows $I=C_i \times C_{max}+R_j$. This computation is summarized in FIG. 23C.

Figure 17:
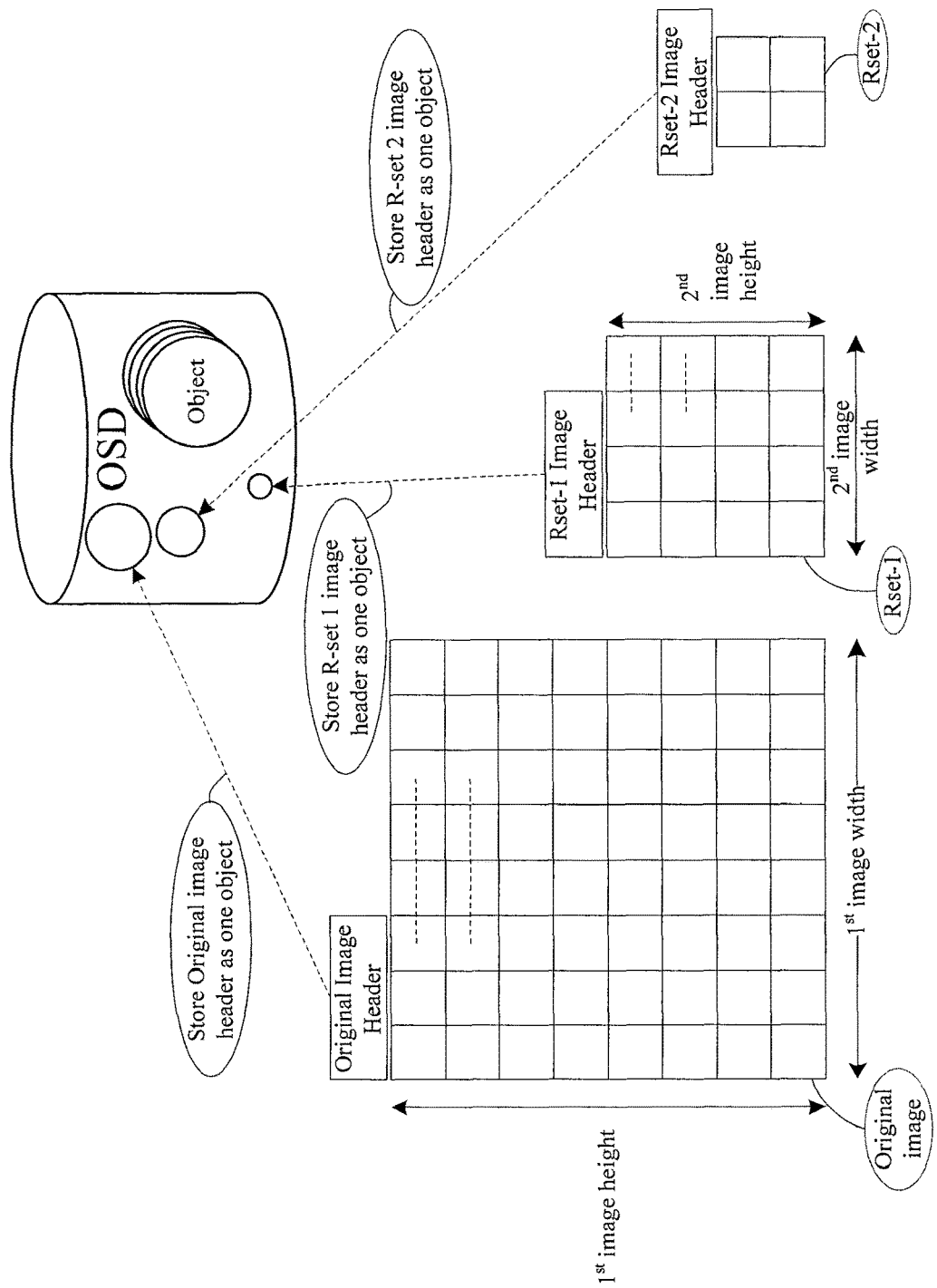
FIG. 17 is diagram illustrating a second step of in the method of storing a WAMI frame as an object, whereby each hybrid image header is stored as a separate object on the OSD, according to an embodiment of the present invention.

FIG. 17 is a diagram illustrating a second step of the method of storing a WAMI frame as an object, whereby each hybrid image header is stored as a separate object on the OSD, according to an embodiment of the present invention. In one embodiment, the image header of the first image of the first WAMI frame is stored as an Object (first header object) on the OSD (represented schematically as a larger size circle). The image header of the first R-set of the first WAMI frame is stored as an Object on the OSD (represented schematically as a medium size circle). The image header of the second R-set of the first WAMI frame is also stored as an object on the OSD (represented schematically as a smaller size circle). Image headers (second header objects) for all R-sets of the first WAMI frame are also stored as distinct Objects on the OSD.

Figure 18:
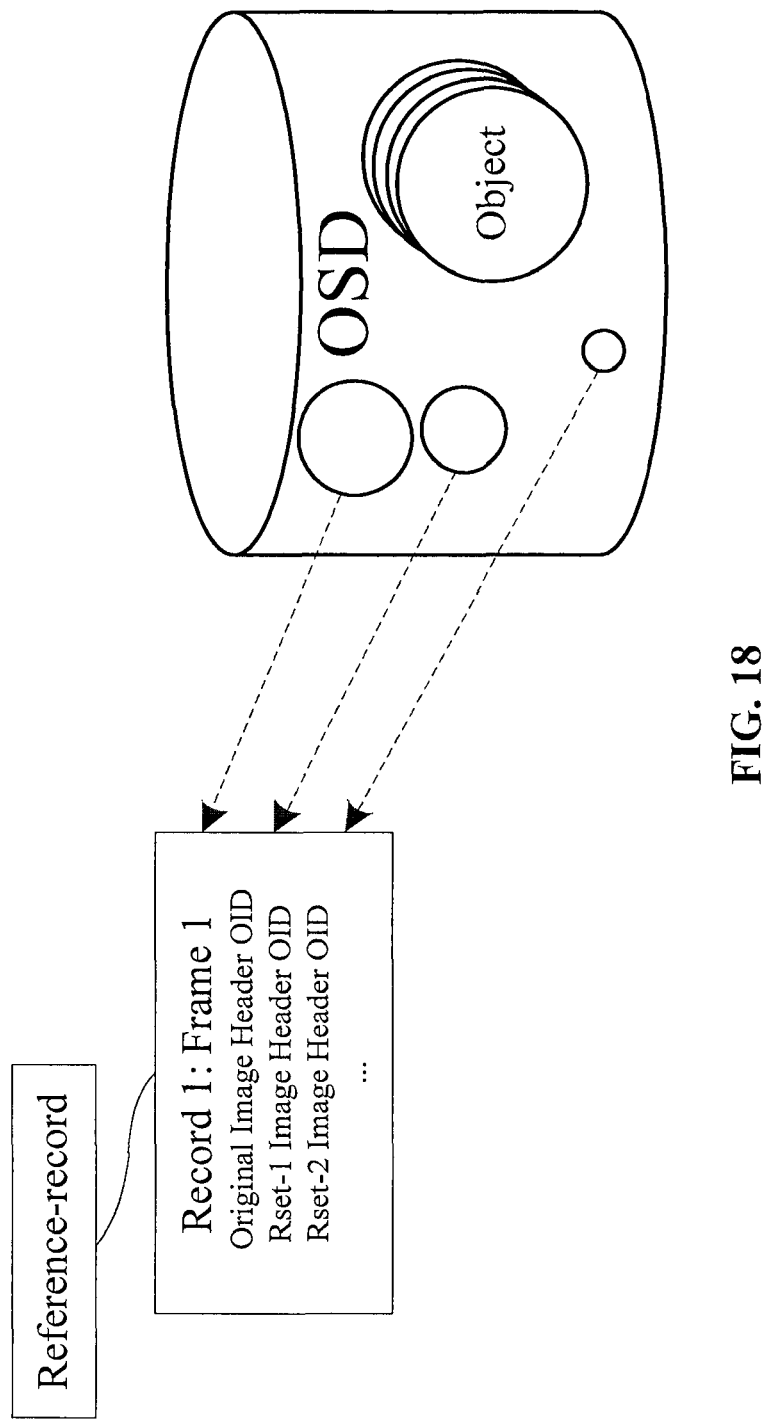
FIG. 18 is a diagram illustrating a third step in the method of storing a WAMI frame as an object, whereby a reference record is generated in computer memory, the reference record comprising a list of OIDs of hybrid image headers of the first image and each associated R-set of the WAMI frame, according to an embodiment of the present invention.

FIG. 18 is a diagram illustrating a third step in the method of storing a WAMI frame as an object, whereby a reference record is generated in computer memory, the reference record including a list of OIDs of hybrid image headers of the first image and each associated R-set of the WAMI frame, according to an embodiment of the present invention. The OID of the first image header or image header object (represented schematically as a larger size circle) and the OIDs of image headers or image header objects of respective R-sets (represented schematically as a medium size circle and smaller size circle) for the first WAMI frame are collected and stored into a first Reference-Record.

Figure 19:
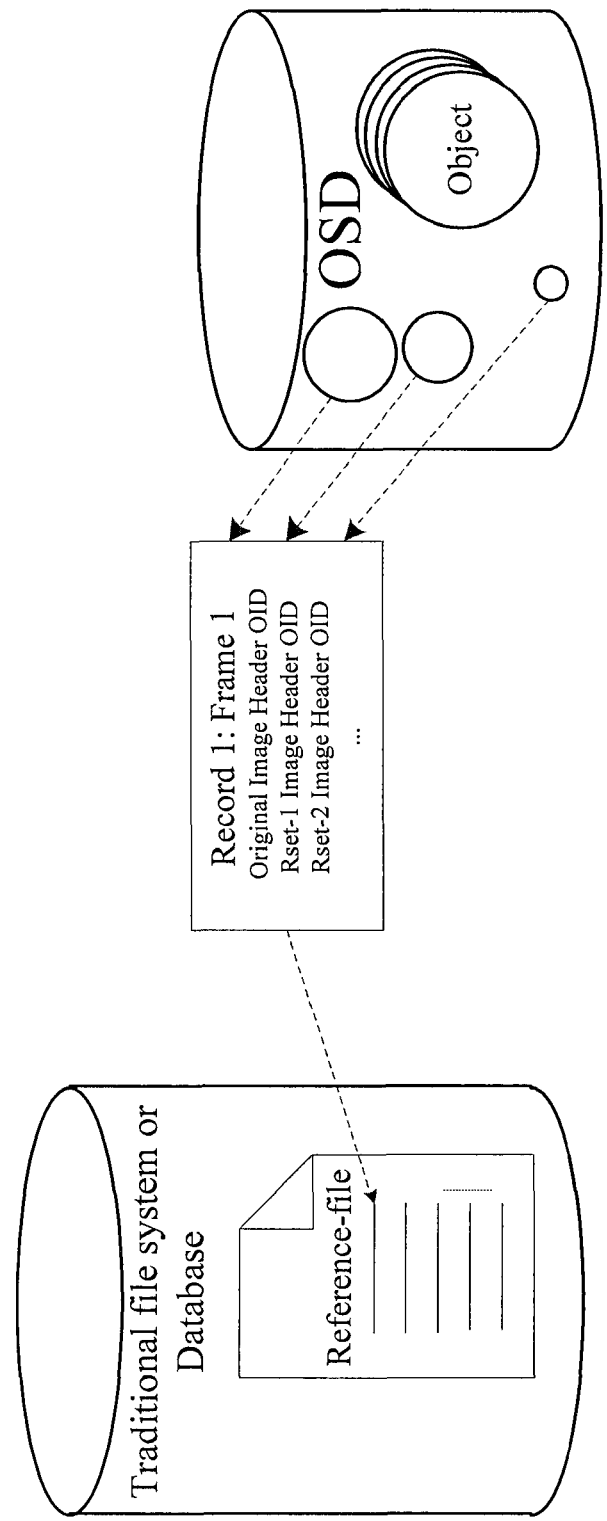
FIG. 19 is a diagram illustrating a fourth step in the method of storing a WAMI frame as an object, whereby a reference record is written to either a reference file on a traditional file system or to a database, according to an embodiment of the present invention.

FIG. 19 is a diagram illustrating a fourth step in the method of storing a WAMI frame as an object, whereby a reference-record is written to either a reference-file on a traditional file system or to a database, according to an embodiment of the present invention. In one embodiment, the reference-record is saved into one reference-file on a traditional file system as one fixed size record. This reference-record represents an indirect reference to one ortho-rectified WAMI frame on an OSD.

Figure 20:
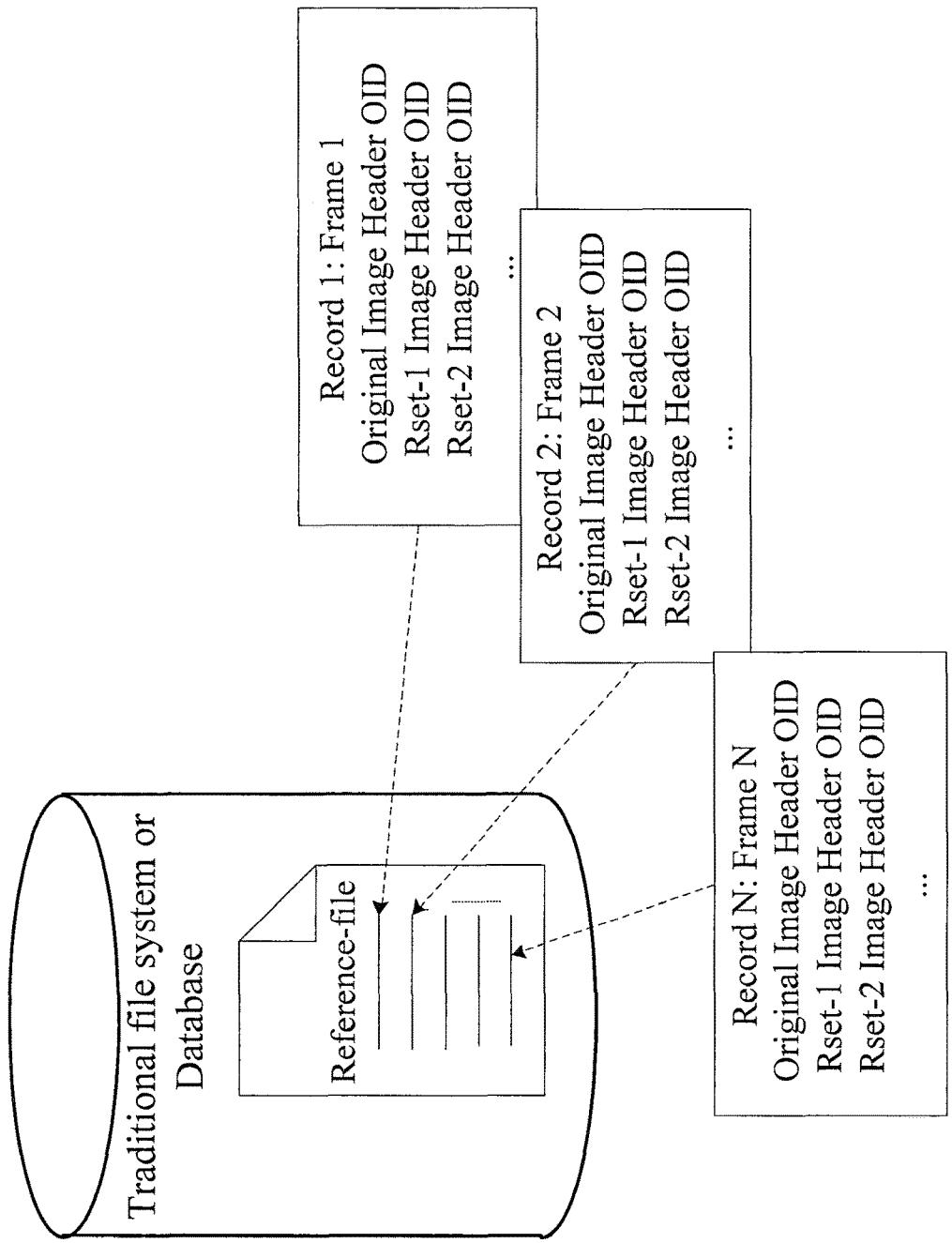
FIG. 20 is a diagram illustrating a fifth step in the method of storing a WAMI frame as an object, whereby all reference records corresponding to the each WAMI frame from a single ortho-rectified WAMI collection are either stored sequentially within a reference file on a traditional file system or in a database, according to an embodiment of the present invention.

FIG. 20 is a diagram illustrating a fifth step in the method of storing a WAMI frame as an object, whereby all reference-records corresponding to the each WAMI frame from a single ortho-rectified WAMI collection are either stored sequentially within a reference-file on a traditional file system or in a database, according to an embodiment of the present invention. In one embodiment, the objects for the first image and R-sets of all ortho-rectified WAMI frames are stored in a similar manner. Reference-records for all ortho-rectified WAMI frames from one WAMI Collection are stored into one reference-file on a traditional file system or into a database. Specifically, the storing of the object identifier of the first header object and the storing the one or more object identifiers of the one or more second header objects in a reference record is repeated for each of a plurality of wide area motion imagery (WAMI) frames (Frame 1, Frame 2, . . . , Frame N), each WAMI frame (Frame 1, Frame 2, . . . , Frame N) having its own first image and its own one or more reduced resolution datasets to obtain a plurality of reference records (Record 1, Record 2, . . . , Record N). Each record (Record 1, Record 2, . . . , Record N) is associated with a corresponding WAMI frame (Frame 1, Frame 2, . . . , Frame N).

Figure 21:
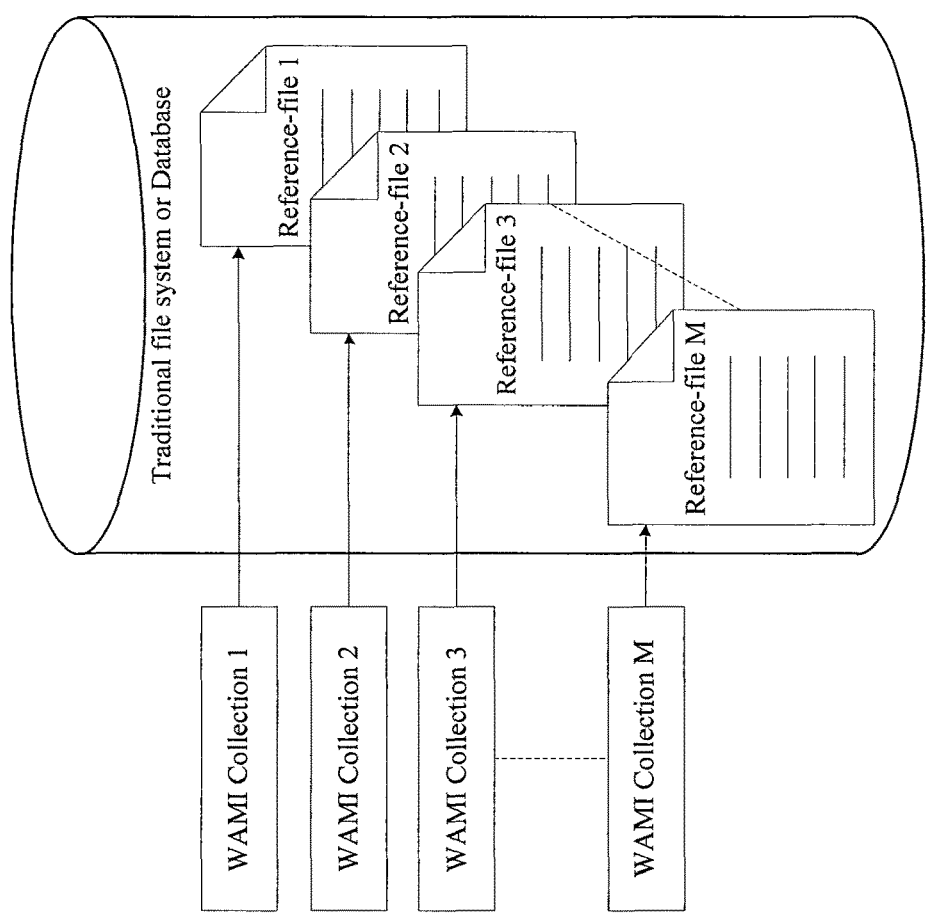
FIG. 21 is a diagram illustrating a sixth step in the method of storing a WAMI frame as an object, whereby multiple reference files exist either on a traditional file system or in a database, each reference file corresponding to a one WAMI Collection, according to an embodiment of the present invention.

FIG. 21 is a diagram illustrating a sixth step in the method of storing a WAMI frame as an object, whereby multiple reference-files exist either on a traditional file system or in a database, each reference-file corresponding to a one WAMI Collection, according to an embodiment of the present invention. In one embodiment, when there are multiple WAMI Collections, each WAMI Collection is stored in a similar fashion. Each WAMI Collection has a corresponding Reference-File on a traditional file system or a corresponding set of Reference-Records in a database. Specifically, in one embodiment the method includes repeating writing the plurality of reference records (Record 1, Record 2, . . . , Record N) into a reference file for each of a plurality WAMI collections (WAMI Collection 1, WAMI Collection 2, . . . , WAMI Collection M), each WAMI collection having a plurality of WAMI frames (Frame 1, Frame 2, . . . , Frame N), to obtain a plurality of reference files (Reference File 1, Reference File 2, . . . , Reference File M), each reference file (Reference File 1, Reference File 2, . . . , Reference File M) being associated with a corresponding WAMI collection (WAMI Collection 1, WAMI Collection 2, . . . , WAMI Collection M). The plurality of reference files (Reference File 1, Reference File 2, . . . , Reference File M) are then stored in a traditional file system or a database.

Figure 22:
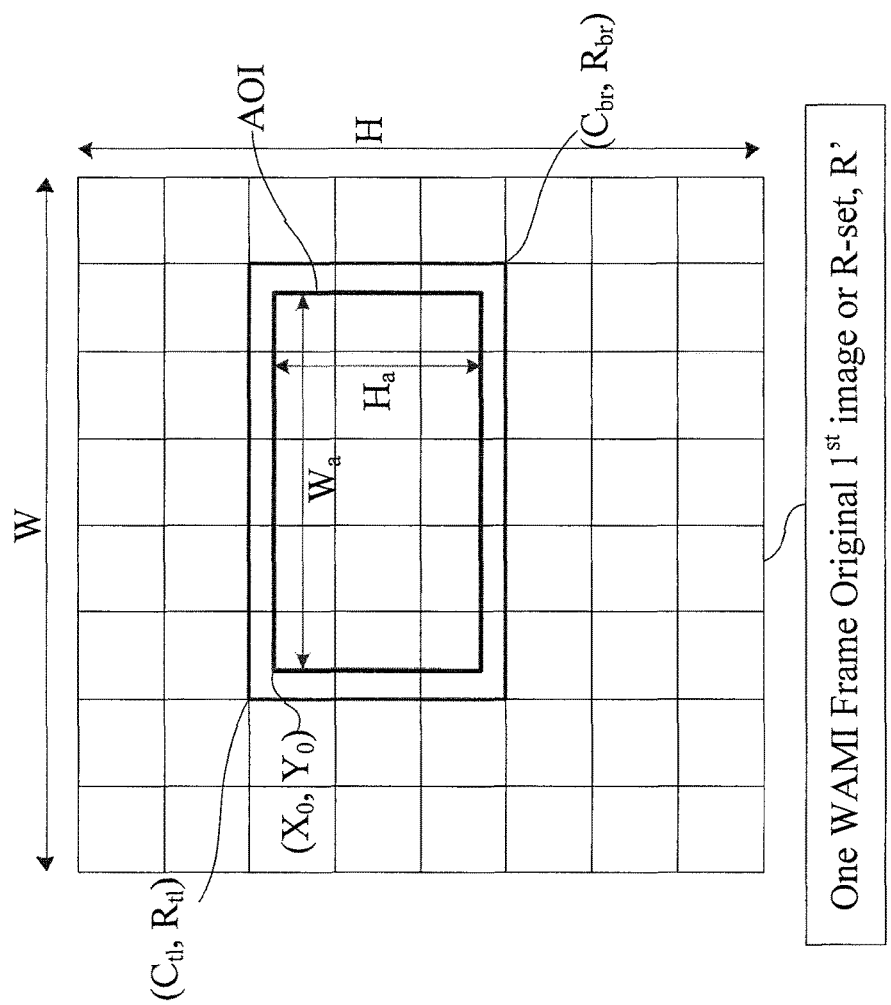
FIG. 22 illustrates a process through which an application may request an area of interest (AOI) from either the first image or any one of the associated R-sets, from an ortho-rectified WAMI frame that belongs to a WAMI collection, according to an embodiment of the present invention.

FIG. 22 illustrates a process through which an application may request an area of interest (AOI) from either the first image or any one of the associated R-sets, from an ortho-rectified WAMI frame that belongs to a WAMI collection, according to an embodiment of the present invention. In one embodiment, the Area of Interest (AOI) or Viewport is wholly located within the first image ($R_0$) or R-set ($R_1$ to $R_N$) from an existing WAMI frame (F) from an existing WAMI Collection (C). The AOI itself is in pixel space. However, a user may request to read the AOI in another coordinate reference system (e.g., metric system). In another embodiment, a user may also request an AOI that may partially contain a portion of the first image or R-set (i.e., the AOI is partially inside the first image or R-set). Using well-known techniques in projection and clipping, the AOI request gets resolved into a bounding box that has a top left corner ($X_0$, $Y_0$) and a pixel width $W_a$ and pixel height $H_a$ that is wholly contained within the requested first image or R-set. If a software system implements a method to deliver the image header for the requested first image or R-set and tiles that intersect with the AOI from the requested first image or R-set, the software system can optimally satisfy an AOI request from any WAMI frame from any WAMI collection.

Figure 23A:
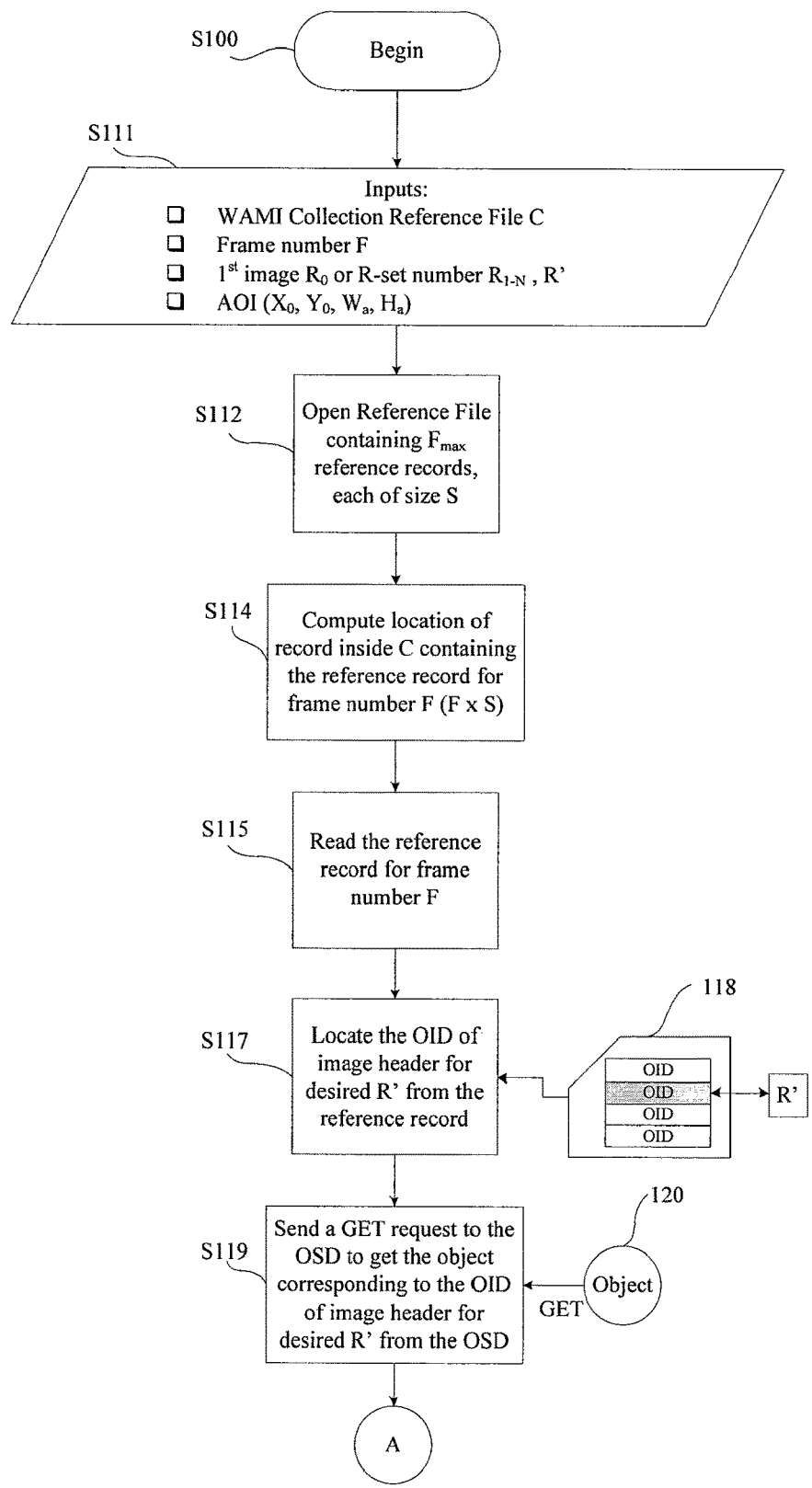
FIG. 23A is a first part of a flowchart of the method to optimally access tiles and metadata corresponding to an AOI from either the first image or any one of the associated R-sets, from an ortho-rectified WAMI frame that belongs to a WAMI collection, according to an embodiment of the present invention.
Figure 23B:
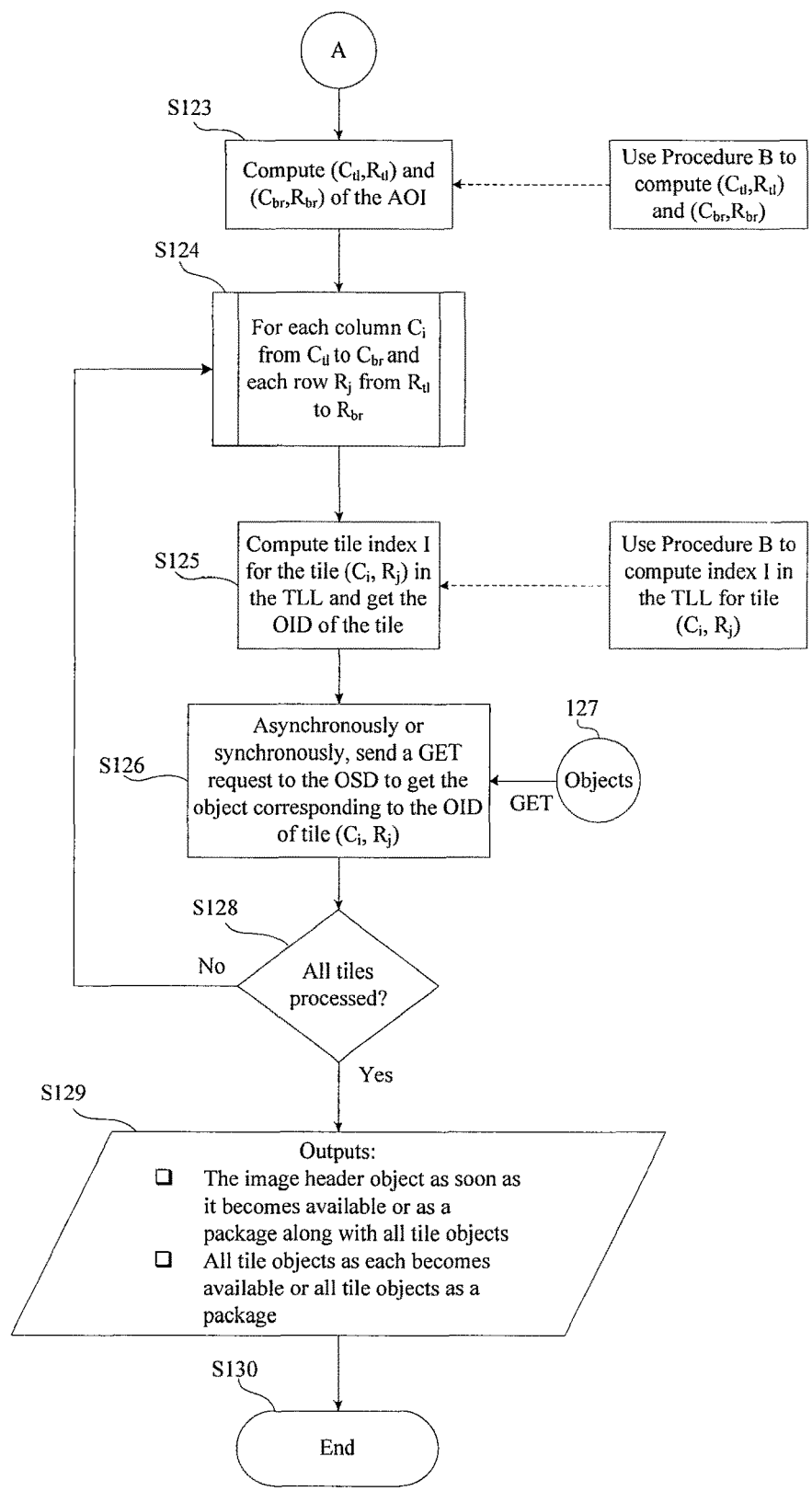
FIG. 23B is a second part of the flowchart of the method to optimally access tiles and metadata corresponding to an AOI from either the first image or any one of the associated R-sets, from an ortho-rectified WAMI frame that belongs to a WAMI collection, according to an embodiment of the present invention.
Figure 23C:
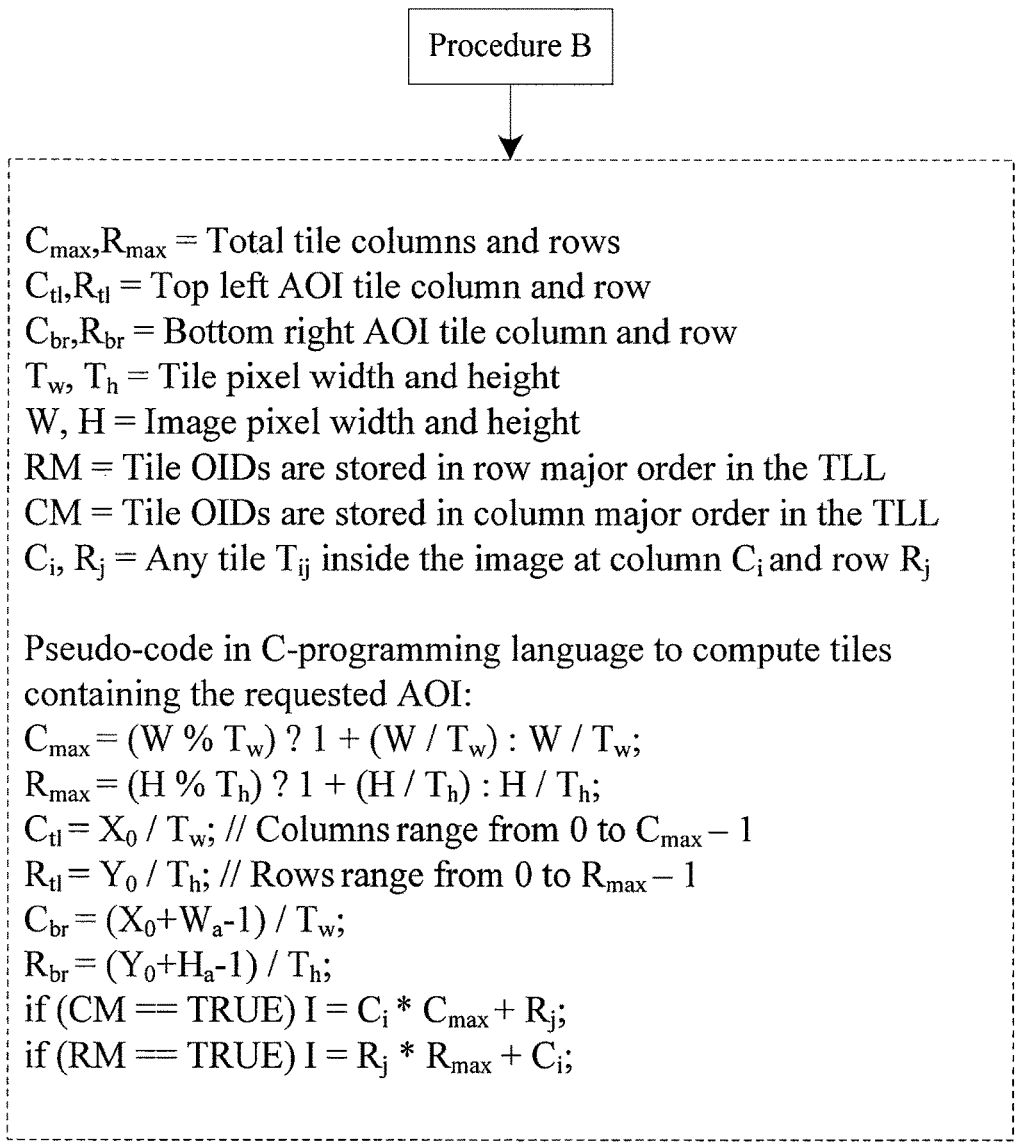
FIG. 23C is a third part of the flowchart of the method to optimally access tiles and metadata corresponding to an AOI from either the first image or any one of the associated R-sets, from an ortho-rectified WAMI frame that belongs to a WAMI collection, according to an embodiment of the present invention.

FIGS. 23A-23C are flowcharts of sub-procedures of a method for accessing tiles that contain a requested AOI ($X_0$, $Y_0$, $W_a$, $H_a$) from a first image or R-set (R') of a WAMI frame (F), of a WAMI Collection (C). FIG. 23A is a first part of a flowchart of the method to optimally access tiles and metadata corresponding to an AOI from either the first image or any one of the associated R-sets, from an ortho-rectified WAMI frame that belongs to a WAMI collection, according to an embodiment of the present invention. FIG. 23B is a second part of the flowchart of the method to optimally access tiles and metadata corresponding to an AOI from either the first image or any one of the associated R-sets, from an ortho-rectified WAMI frame that belongs to a WAMI collection, according to an embodiment of the present invention. FIG. 23C is a third part of the flowchart of the method to optimally access tiles and metadata corresponding to an AOI from either the first image or any one of the associated R-sets, from an ortho-rectified WAMI frame that belongs to a WAMI collection, according to an embodiment of the present invention.

Turning to FIG. 23A, the method begins at S100. The method includes requesting the AOI, at S111. The AOI with parameters ($X_0$, $Y_0$, $W_a$, $H_a$) is located either in a first image or in any one of the associated R-set images (R') of a WAMI frame (F) of a WAMI Collection Reference File (C). The method includes opening a Reference-File corresponding to WAMI Collection C, at S112. Each Reference Record stored within the Reference-File that corresponds to WAMI collection C has a size of S bytes. The method includes computing a location or offset of the Reference Record within the Reference File for the WAMI frame F as F×S, at S114. The method further includes reading the Reference Record of size S from the Reference File at offset F×S for the requested WAMI frame F, at S115. The Reference Record has a list of OIDs for image headers for the first image and all R-sets for WAMI frame F. The method includes locating the OID of the image header of the image R' (corresponding to either the first image R0 or any one of the R-set images) containing the requested AOI, at S117 using the Reference Record OID list 118. The method further includes sending a "Get" request to the OSD, at S119, to retrieve the Object 120 for the desired image header of image R'.

Turning to FIG. 23B, the method continues by computing the row and column number for the tile containing the top-left corner ($C_{tl}$, $R_{tl}$) and bottom right corner ($C_{br}$, $R_{br}$) (see, FIG. 22) of the AOI, at S123. The computing is performed using the sub-procedure "B", shown in FIG. 23C.

The method includes iterating, at S124, for each tile ($C_i$, $R_j$) ranging from ($C_{tl}$, $R_{tl}$) to ($C_{br}$, $R_{br}$), the computing, at S125, of the index I for each tile ($C_i$, $R_j$) in the TLL and obtain the OID of each tile. Index I is computed using the formula specified sub-procedure "B" in FIG. 23C. The method further includes sending a "Get" request to the OSD, at S126, to retrieve the Object 127 for the desired tile ($C_i$, $R_j$). The "Get" request is sent to the OSD either synchronously or asynchronously, using one or more software threads.

The method further includes determining whether all tiles ranging from ($C_{tl}$, $R_{tl}$) to ($C_{br}$, $R_{br}$) are processed, at S128, to verify if requests to retrieve objects of all the tiles ranging from ($C_{tl}$, $R_{tl}$) to ($C_{br}$, $R_{br}$) have been issued to the OSD. If not, the method repeats at S124, the computing at S125 and the sending of a get request at S126. If yes, i.e., if all tiles are processed, the method continues to S129, by outputting the desired image header of image R' that contains the requested AOI and the tiles from image R' that contain the requested AOI. The method then ends at S130.

FIG. 23C depicts sub-procedure "B". Sub-procedure "B" is implemented by the method to compute index I in the TLL for a tile ($C_i$, $R_j$) as shown in FIG. 23B. In sub-procedure B, $C_{max}$ represents the maximum number of columns of tiles in image R'. $R_{max}$ is the maximum number of rows of tiles in image R'. ($C_{tl}$, $R_{tl}$) is the column and row number of the top left tile containing the requested AOI. ($C_{br}$, $R_{br}$) is the column and row number of the bottom right tile containing the requested AOI. ($C_{tl}$, $R_{tl}$) and ($C_{br}$, $R_{br}$) are also shown in FIG. 22. The term RM indicates that the OIDs for all tiles in image R' are stored in the image header in row-major order. The term CM indicates that the OIDs for all tiles in image R' are stored in the image header in column-major order. A tile $T_{ij}$ is any tile at column and row number ($C_i$, $R_j$), where ($C_i$, $R_j$) ranges from ($C_{tl}$, $R_{tl}$) to ($C_{br}$, $R_{br}$).

In FIG. 23C, the equations for computing various values that describe part of sub-procedure "B" have been represented using the syntax of the C-programming language. However, as it can be appreciated, any other syntax of any other programming language can be used.

$$C_{max}=(W \% T_w)?1+(W/T_w):W/T_w;$$

$$R_{max}=(H \% T_h)?1+(H/T_h):H/T_h,$$

$$C_{tl}=X_0/T_w;$$

$$R_{tl}=Y_0/T_h;$$

$$C_{br}=(X_0+W_a-1)/T_w;$$

$$R_{br}=(Y_0+H_a-1)/T_h;$$

if (CM==TRUE) $I=C_i*C_{max}+R_j;$ if (RM==TRUE) $I=R_j*R_{max}+C_i$

Figure 24A:
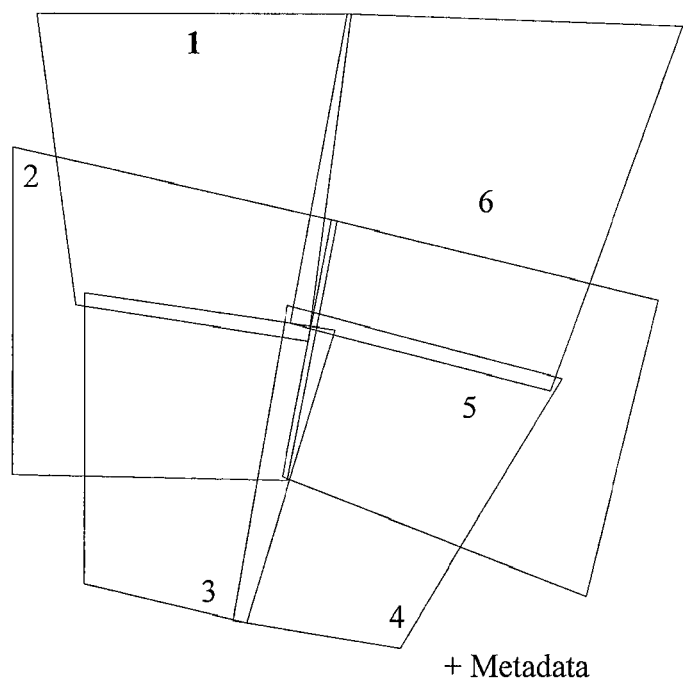
FIG. 24A is a schematic diagram representing an example of a plurality of images captured by a multi-sensor image capture system, each of the plurality of images are captured at substantially the same time, the plurality of images representing, in totality, a single large image.
Figure 24B:
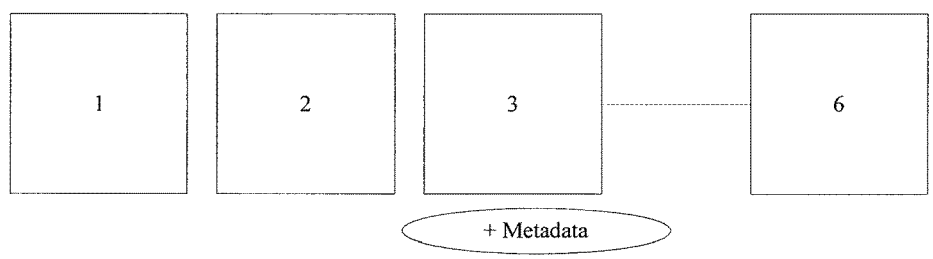
FIG. 24B is a schematic diagram representing an example of a multi-sensor image capture system capturing more than one image, each at substantially the same time.

FIG. 24A is a schematic diagram representing an example of a plurality of images captured by a multi-sensor image capture system, each of the plurality of images are captured at substantially the same time, the plurality of images representing, in totality, a single larger image. FIG. 24B is a schematic diagram representing an example of a multi-sensor image capture system capturing more than one image, each at substantially the same time.

As shown in FIG. 24A and FIG. 24B, an image sensor or detector may include multiple smaller sensors. The image detector produces one image per sensor at substantially the same instant in time and thus provides a plurality or multiple smaller images (e.g., images 1, 2, 3, 4, 5, and 6). The multiple smaller images (e.g., images 1, 2, 3, 4, 5 and 6) can be processed to obtain a single large WAMI frame. The images captured by such a multi-sensor system (e.g., images 1, 2, 3, 4, 5 and 6) are also referred to as camera-space image data. Each image (image 1, image 2, etc.) also includes metadata (e.g., the identification of the sensor that captured the image, the time the image was captured, the size of the image, etc.). The method and system for storage of each of the images (e.g., images 1, 2, 3, 4, 5 and 6) and metadata captured by each of the smaller sensors is the same as depicted for the one large image described in the above paragraphs. Each of the images numbered 1, 2, 3, 4, 5 and 6 are not different in their general structure from the image shown in FIG. 1, for example. In fact, as an example, the images numbered 1, 2, 3, 4, 5 and 6 can be combined and ortho-rectified to generate the image in FIG. 1. In one embodiment each of the plurality smaller images (e.g., images 1, 2, 3, 4, 5 and 6) can be ortho-rectified and then combined to form an ortho-rectified larger imager. In another embodiment, the plurality of smaller images can be combined to form an ortho-rectified larger image. Either way, the methods and systems described above can be applied to the smaller images (e.g., images 1, 2, 3, 4, 5 and 6) or larger image including the smaller images before ortho-rectifying the image(s) or after ortho-rectifying the image(s). Each of the images numbered 1, 2, 3, 4, 5 and 6 can be stored on an OSD using the methods or system described herein in the above paragraphs. Therefore, in one embodiment, the methods and systems described herein extend to include storing original camera-space image data and metadata captured by an image sensor or detector having, for example, one or more smaller image sensors.

In some embodiments, programs for performing the methods in accordance with embodiments of the invention can be embodied as program products in a computer such as a personal computer or server or in a distributed computing environment comprising a plurality of computers. The computer may include, for example, a desktop computer, a laptop computer, a handheld computing device such as a PDA, a tablet, etc. The computer program products may include a computer readable medium or storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer or server via a network such as the internet, an ATM network, a wide area network (WAN) or a local area network.

Stored on one or more of the computer readable media, the program may include software for controlling both the hardware of a general purpose or specialized computer or processor. The software also enables the computer or processor to interact with a user via output devices such as a graphical user interface, head mounted display (HMD), etc. The software may also include, but is not limited to, device drivers, operating systems and user applications.

Alternatively, instead or in addition to implementing the methods described above as computer program product(s) (e.g., as software products) embodied in a computer, the method described above can be implemented as hardware in which for example an application specific integrated circuit (ASIC) or graphics processing unit or units (GPU) can be designed to implement the method or methods of the present invention.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 25:
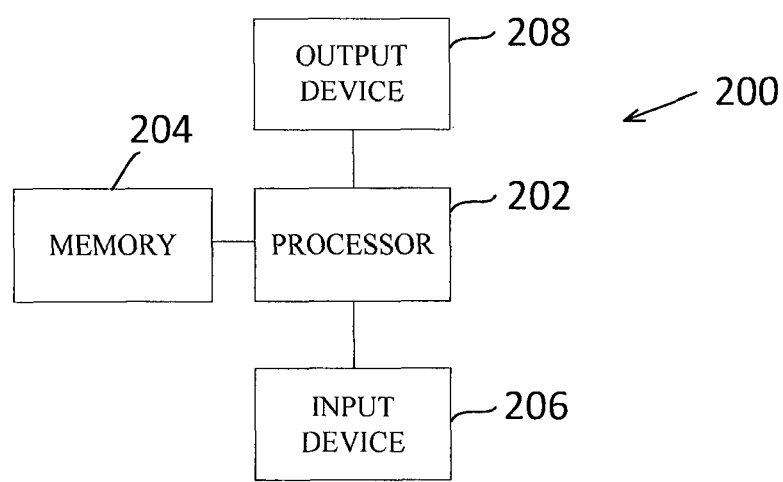
FIG. 25 is a schematic diagram representing a computer system for implementing the methods, for example embodied as program products, according to an embodiment of the present invention.

FIG. 25 is a schematic diagram representing a computer system 200 for implementing the methods, for example embodied as program products, according to an embodiment of the present invention. As shown in FIG. 25, computer system 200 comprises a processor (e.g., one or more processors) 202 and a memory 204 in communication with the processor 202. The computer system 200 may further include an input device 206 for inputting data (such as keyboard, a mouse or the like) and an output device 208 such as a display device for displaying results of the computation. Processor 202 may be configured to execute computer program modules (e.g., software components or instructions) for implementing the methods.

As it can be appreciated from the above paragraphs, an aspect of an embodiment of the present invention is to provide a system (e.g., system 200) of organizing data of a wide area motion imagery frame. The system includes a processor (e.g., processor 202) configured to: divide an image of a wide area motion imagery (WAMI) frame into a plurality of tiles, each tile in the plurality of tiles comprising a plurality of pixels and having a pixel width and a pixel height; store the plurality of tiles as objects in an object storage device (OSD), each object having an object identifier (OID); collect object identifiers (OIDs) of the objects; and store the OIDs in the object storage device (OSD).

Another aspect of an embodiment of the present invention is to provide a system (e.g., system 200) of retrieving objects that match a user defined area of interest (AOI) from an image in a WAMI frame in a WAMI collection, the image having one or more tiles, and the object being stored in a reference file associated with the WAMI collection containing the WAMI frame. The system includes a processor (e.g., processor 202) configured to: receive a request for the AOI, the AOI being wholly located in the image, and the AOI having one or more tiles, the request including an origin and a pixel width and a pixel height of the AOI; compute a top row and a left column number of a tile that contains a top-left corner of the AOI and a bottom row and a right column number of a tile that contains a bottom-right corner of the AOI; compute for each column from the left column to the right column and for each row from the top row to the bottom row, a tile index of each tile in the one or more tiles of the AOI, in a tile locator list to obtain an object identifier (OD) corresponding to each tile; and send a request to an object storage device (OSD) containing a plurality of objects tiles of the WAMI frame to retrieve an object associated with each of the one or more tiles of the AOI. In one embodiment, the processor may further be configured to output an image header of the image that contains the requested AOI and tiles from the image that contains the requested AOI.

Although the various steps of the above method(s) are described in the above paragraphs as occurring in a certain order, the present application is not bound by the order in which the various steps occur. In fact, in alternative embodiments, the various steps can be executed in an order different from the order described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A method of organizing data of an image of a wide area motion imagery, the method being implemented by a computer system that includes one or more processors configured to execute computer program modules, the method comprising:
    dividing, by the one or more processors, an image of a wide area motion imagery (WAMI) into a plurality of tiles, the image having a pixel height and a pixel width, each tile in the plurality of tiles comprising a plurality of pixels and having a pixel width and a pixel height, the WAMI image comprising a plurality of WAMI images that are captured sequentially in time using an image capture device;
    dividing, by the one or more processors, a reduced resolution dataset (R-set) of the image into a plurality of R-set tiles, the R-set having a pixel width and a pixel height that is smaller than the pixel width and the pixel height of the image, and each R-set tile in the R-set comprising a plurality of pixels and having a pixel width and a pixel height;
    storing, by the one or more processors, the plurality of tiles of the image as first tile objects in an object storage device (OSD) in communication with the one or more processors, each first tile object having a first object identifier (OID);
    storing, by the one or more processors, the plurality of R-set tiles of the R-set of the image as second tile objects in the OSD, each second tile object having a second OID;
    collecting, by the one or more processors, first OIDs of the first tile objects;
    collecting, by the one or more processors, second OIDs of the second tile objects;
    adding the first OIDs of the first tile objects to a first header of the image, the first header of the image containing information about the image;
    adding the second OIDs of the second tile objects to a second header of the R-set, the second header of the R-set comprising information about the R-set;
    storing the first header of the image as a first header object in the OSD, the first header object having a first header OID; and
    storing the second header of the R-set as a second R-set header object in the OSD, the second R-set header object having a second header OID.

2. The method according to claim 1, further comprising ortho-rectifying, by the one or more processors, the WAMI image, the R-set of the image, or both.

3. The method according to claim 1, wherein a pixel height and a pixel width of a tile in the plurality of tiles of the WAMI image is substantially the same as a pixel height and a pixel width of a tile in the plurality of R-set tiles of the R-set.

4. The method according to claim 1, further comprising:
    storing the first header OID and the second header OID in a reference record; and
    prior to storing the first header OID, generating, by the one or more processors, the reference record in computer memory.

5. The method according to claim 1, further comprising:
    storing the first header OID and the second header OID in a reference record; and
    prior to storing the second header object identifier in the reference record, generating, by the one or more processors, the reference record in computer memory.

6. The method according to claim 1, further comprising:
    storing the first header OID and the second header OID in a reference record; and
    repeating, by the one or more processors, storing the first header OID in a reference record for each of the plurality of WAMI images to obtain a plurality of reference records, each reference record being associated with a corresponding WAMI image.

7. The method according to claim 6, repeating, by the one or more processors, storing the second header object identifier in the reference record for a plurality of plurality of R-sets, each WAMI image having at least one R-set, to obtain a plurality of reference records, each reference record being associated with a corresponding WAMI image and a corresponding R-set.

8. The method according to claim 7, further comprising writing, by the one or more processors, the plurality of reference records into the reference file on a traditional file system or to a reference file in a database.

9. The method according to claim 8, repeating, by the one or more processors, writing the plurality of reference records into the reference file for each of a plurality WAMI collections, each WAMI collection having a plurality of WAMI images, to obtain a plurality of reference files, each reference file being associated with a corresponding WAMI collection, and storing the plurality of reference files in the traditional file system or the database.

10. The method according to claim 1, further comprising:
    storing the first header OID and the second header OID in a reference record; and
    writing the reference record to a reference file on a traditional file system or in a database.

11. A non-transitory computer program product comprising a computer readable medium having instructions stored thereon when executed by a computer system performs the method recited in claim 1.

12. A system of organizing data of a wide area motion imagery, the system comprising:
    one or more processors configured to:
    divide an image of a wide area motion imagery (WAMI) into a plurality of tiles, the image having a pixel height and a pixel width, each tile in the plurality of tiles comprising a plurality of pixels and having a pixel width and a pixel height, the WAMI image comprising a plurality of WAMI images that are captured sequentially in time using an image capture device;

divide a reduced resolution datasets (R-set) of the image into a plurality of R-set tiles, the R-set having a pixel width and a pixel height that is smaller than the pixel width and the pixel height of the image, and each R-set tile in the plurality of R-set tiles comprising a plurality of pixels and having a pixel width and a pixel height;

store the plurality of tiles of the image as first tile objects in an object storage device (OSD) in communication with the one or more processors, each first tile object having a first object identifier (OID);

store the plurality of R-set tiles of the R-set of the image as second tile objects in the OSD, each second tile object having a second OID;

collect first OIDs of the first tile objects;

collect second OIDs of the second tile objects;

add the first OIDs of the first tile objects to a first header of the image, the first header of the image containing information about the image;

add the second OIDs of the second tile objects to a second header of the R-set of the image, the second header of the R-set comprising information about the R-set;

store the first header of the image as a first header object in the OSD, the first header object having a first header OID; and store the second header of the R-set as a second R-set header object in the OSD, the second R-set header object having a second header OID.

13. The system according to claim 12, wherein the one or more processors are configured to:

store the first header OID and the second header OID in a reference record, wherein the one or more processors are configured to write the reference record to a reference file on a traditional file system or in a database.

14. The system according to claim 12, wherein the one or more processors are configured to ortho-rectify the image, the R-set of the image, or both.

15. The system according to claim 12, wherein the one or more processors are configured to store metadata including a tile locator list to indicate a position of a tile in the plurality of tiles of the image and a size of the tile in the image.

16. The system according to claim 12, wherein the one or more processors are configured to:

store the first header OID and the second header OID in a reference record, wherein the one or more processors are configured to generate the reference record in computer memory prior to storing the first header OID.

17. The system according to claim 12, wherein the WAMI image comprises a plurality of smaller images being captured by a plurality of image sensors of the image capture device substantially at the same time.

18. The system according to claim 12, wherein the WAMI image is one image in a plurality of images captured by a plurality of image sensors of the image capture device substantially at the same time, the plurality of images being captured by the plurality of image sensors forming a single larger image.

19. A method of organizing data of an image of a wide area motion imagery, the method being implemented by a computer system that includes one or more processors configured to execute computer program modules, the method comprising:

dividing, by the one or more processors, an image of a wide area motion imagery (WAMI) into a plurality of tiles, the image having a pixel height and a pixel width, each tile in the plurality of tiles comprising a plurality of pixels and having a pixel width and a pixel height, the WAMI image comprising a plurality of WAMI images that are captured sequentially in time using an image capture device;

dividing, by the one or more processors, a reduced resolution dataset (R-set) of the image into a plurality of R-set tiles, the R-set having a pixel width and a pixel height that is smaller than the pixel width and the pixel height of the image, and each R-set tile in the R-set comprising a plurality of pixels and having a pixel width and a pixel height;

storing, by the one or more processors, the plurality of tiles of the image as a plurality of first tile objects in an object storage device (OSD) in communication with the one or more processors, each of the plurality of first tile objects having a first object identifier (OID) and each of the first OIDs being distinct from one another; and storing, by the one or more processors, the plurality of R-set tiles of the R-set of the image as a plurality of second tile objects in the OSD, each of the plurality of second tile objects having a second OID and each of the second OIDs being distinct from one another;

collecting, by the one or more processors, the first OIDs;

adding the first OIDs to a first header of the image, the first header of the image containing information about the image;

storing the first header of the image as a first header object in the OSD, the first header object having a first header OID;

storing, separately from the OSD, the first header OID in a reference file of a traditional file system or in a database, wherein the first header OID identifies the first header object; and ortho-rectifying, by the one or more processors, the WAMI image.

20. The method according to claim 19, further comprising storing, by the one or more processors, metadata including a tile locator list to indicate a position of a tile in the plurality of tiles of the image and a size of the tile in the image.

21. The method according to claim 19, wherein the WAMI image comprises a plurality of smaller images being captured by a plurality of image sensors of the image capture device substantially at the same time.

22. The method according to claim 21, further comprising ortho-rectifying, by the one or more processors, each of the plurality of smaller images.

23. The method according to claim 19, wherein the WAMI image is one image in a plurality of images captured by a plurality of image sensors of the image capture device substantially at the same time, the plurality of images being captured by the plurality of image sensors forming a single larger image.

* * * * *